United States Patent
Blasco Serrano et al.

(10) Patent No.: US 10,743,267 B2
(45) Date of Patent: Aug. 11, 2020

(54) DROPPING MEASUREMENTS OF SYNCHRONIZATION SIGNALS

(71) Applicant: Telefonaktiebolaget LM Ericsson (publ), Stockholm (SE)

(72) Inventors: Ricardo Blasco Serrano, Espoo (FI); Stefano Sorrentino, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 134 days.

(21) Appl. No.: 15/772,426

(22) PCT Filed: Nov. 2, 2016

(86) PCT No.: PCT/SE2016/051076
§ 371 (c)(1),
(2) Date: Apr. 30, 2018

(87) PCT Pub. No.: WO2017/078599
PCT Pub. Date: May 11, 2017

(65) Prior Publication Data
US 2018/0324718 A1    Nov. 8, 2018

Related U.S. Application Data

(60) Provisional application No. 62/251,428, filed on Nov. 5, 2015, provisional application No. 62/374,370, filed on Aug. 12, 2016.

(51) Int. Cl.
*H04W 56/00* (2009.01)
*H04W 76/10* (2018.01)
(Continued)

(52) U.S. Cl.
CPC ......... *H04W 56/001* (2013.01); *H04W 4/00* (2013.01); *H04W 56/0015* (2013.01); *H04W 76/10* (2018.02); *H04W 8/005* (2013.01)

(58) Field of Classification Search
CPC .................... H04W 56/00; H04W 56/001
See application file for complete search history.

(56) References Cited

U.S. PATENT DOCUMENTS

2018/0076984 A1* 3/2018 Yang .................. H04L 7/08
2018/0139769 A1* 5/2018 Lee .................. H04W 72/06
(Continued)

FOREIGN PATENT DOCUMENTS

WO    2015115974 A1   8/2015
WO    2015143170 A1   9/2015

OTHER PUBLICATIONS

3GPP TSG RAN WG1 Meeting #82bis; Malmo, Sweden; Source: Intel Corporation; Title: Synchronization Aspects for V2V/V2X Communication (R1-155331)—Oct. 5-9, 2015.
(Continued)

*Primary Examiner* — Kodzovi Acolastse
*Assistant Examiner* — Abdeltif Ajid
(74) *Attorney, Agent, or Firm* — Sage Patent Group

(57) ABSTRACT

A method in wireless device (110) is disclosed. The method comprises determining (404) a synchronization source for the wireless device, and determining (408) a synchronization priority of the synchronization source. The method comprises determining (412) one or more rules for dropping transmissions of sidelink synchronization signals, the one or more rules corresponding to the synchronization priority of the synchronization source. The method comprises dropping (416) transmissions of sidelink synchronization signals according to the determined one or more rules for dropping transmissions of sidelink synchronization signals.

20 Claims, 10 Drawing Sheets

(51) Int. Cl.
*H04W 4/00* (2018.01)
*H04W 8/00* (2009.01)

(56) References Cited

U.S. PATENT DOCUMENTS

2018/0213498 A1* 7/2018 Khoryaev ......... H04W 56/0015
2018/0270776 A1* 9/2018 Yasukawa ......... H04W 56/0025

OTHER PUBLICATIONS

3GPP TSG-RAN WG4 #74; Athens, Greece; Source: Qualcomm Incorporated; Title: Simulation assumptions for D2D synchronization requirements (R4-150201)—Feb. 9-13, 2015.
PCT International Search Report for International application No. PCT/SE2016/051076—dated Jan. 19, 2017.
PCT Written Opinion of the International Searching Authority for International application No. PCT/SE2016/051076—dated Jan. 19, 2017 .
Extended European Search Report—16862560.6—dated May 24, 2019—6 Pages.

* cited by examiner

US 10,743,267 B2

DROPPING MEASUREMENTS OF SYNCHRONIZATION SIGNALS

PRIORITY

This nonprovisional application is a U.S. National Stage Filing under 35 U.S.C. § 371 of International Patent Application Serial No. PCT/SE2016/051076 filed Nov. 2, 2016, and entitled "Dropping Measurements of Synchronization Signals" which claims priority to U.S. Provisional Patent Application No. 62/251,428 filed Nov. 5, 2015 and U.S. Provisional Patent Application No. 62/374,370 filed Aug. 12, 2016, all of which are hereby incorporated by reference in their entirety.

TECHNICAL FIELD

The present disclosure relates, in general, to wireless communications and, more particularly, to dropping measurements of synchronization signals.

BACKGROUND

During Release 12, the Long Term Evolution (LTE) standard has been extended with support of device-to-device (D2D) (specified as "sidelink") features targeting both commercial and Public Safety applications. An example application enabled by Release 12 LTE is device discovery, where devices are able to sense the proximity of another device and associated application by broadcasting and detecting discovery messages that carry device and application identities. Another example application enabled by Release 12 LTE is direct communication based on physical channels terminated directly between devices.

One of the potential extensions for D2D is support of vehicle-to-anything-you-can-imagine (V2x) communication, which includes any combination of direct communication between vehicles, pedestrians and infrastructure. V2x communication may take advantage of a network infrastructure, when available, but at least basic V2x connectivity should be possible even in case of lack of coverage. Providing an LTE-based V2x interface may be economically advantageous because of the LTE economies of scale, and it may enable tighter integration between communications with the network infrastructure (V2I), vehicle-to-pedestrian (V2P) communications, and vehicle-to-vehicle (V2V) communications, as compared to using a dedicated V2x technology.

V2x communications may carry both non-safety and safety information, where each of the applications and services may be associated with a specific set of requirements (e.g., in terms of latency, reliability, capacity, etc.). For example, the European Telecommunications Standards Institute (ETSI) has defined two types of messages for road safety: the Cooperative Awareness Message (CAM) and the Decentralized Environmental Notification Message (DENM).

The CAM message is intended to enable vehicles, including emergency vehicles, to notify their presence and other relevant parameters in a broadcast fashion. These messages target other vehicles, pedestrians, and infrastructure, and are handled by their applications. CAM messages also serve as active assistance to safety driving for normal traffic. The availability of a CAM message is indicatively checked for every 100 ms, yielding a maximum detection latency requirement of less than or equal to 100 ms for most messages. The latency requirement for a pre-crash sensing warning, however, is 50 ms.

The DENM message is event-triggered, such as by braking. The availability of a DENM message is also checked for every 100 ms. The requirement of maximum latency is less than or equal to 100 ms.

The package size of CAM and DENM messages varies from 100+ to 800+ bytes, and the typical size is around 300 bytes. The message is supposed to be detected by all vehicles in proximity.

The Society of the Automotive Engineers (SAE) has also defined the Basic Safety Message (BSM) for Dedicated Short Range Communications (DSRC), with various message sizes defined. According to the importance and urgency of the messages, BSMs are further classified into different priorities.

In Release 12/13 sidelink, wireless devices (such as, for example, user equipment (UE)) use a distributed protocol to provide common time and frequency synchronization references. In this protocol, all sidelink wireless devices simultaneously transmit synchronization signals at periodic intervals. In this way, synchronization derived from a network node (e.g., eNodeB (eNB)) signals can be propagated to wireless devices that are out of coverage. Moreover, wireless devices can create ad-hoc synchronization zones without any need for eNB signals.

In practice, wireless devices often have half-duplex constraints that prevent them from listening to the synchronization signals broadcasted by other wireless devices at the same time they transmit their own synchronization signals. Thus, to allow wireless devices to acquire/maintain synchronization, they are allowed to drop a percentage of these transmissions. This percentage is common to all wireless devices.

For V2x communications, the possibility of using several sources of synchronization is under discussion. In particular, it has been proposed that wireless devices derive synchronization from one or more of the following sources: Global Navigation Satellite System (GNSS) signals, eNB signals, and/or wireless device signals transmitted using a distributed protocol similar to the one in Release 12/13 sidelink. Each of these synchronization sources has a different level of accuracy. For example, in general the accuracy of synchronization obtained using the distributed protocol will be lower than that derived from GNSS signals.

SUMMARY

To address the foregoing problems with existing approaches, disclosed is a method in a wireless device. The method comprises determining a synchronization source for the wireless device, and determining a synchronization priority of the synchronization source. The method comprises determining one or more rules for dropping transmissions of sidelink synchronization signals, the one or more rules corresponding to the synchronization priority of the synchronization source. The method comprises dropping transmissions of sidelink synchronization signals according to the determined one or more rules for dropping transmissions of sidelink synchronization signals.

In certain embodiments, determining the one or more rules for dropping transmissions of sidelink synchronization signals may comprise autonomously determining the one or more rules for dropping transmissions of sidelink synchronization signals. In certain embodiments, determining the one or more rules for dropping transmissions of sidelink synchronization signals may comprise receiving information about the one or more rules for dropping transmissions of sidelink synchronization signals from one of a network node or another wireless device.

In certain embodiments, the method may comprise determining whether the wireless device is accurately synchronized to the determined synchronization source. The synchronization priority of the synchronization source may be based on an accuracy level of the synchronization source.

In certain embodiments, a first synchronization source may have a first synchronization priority. The one or more rules corresponding to the first synchronization priority may comprise a rule prohibiting the wireless device from dropping transmissions of sidelink synchronization signals for the purpose of detecting incoming synchronization signals. A second synchronization source may have a second synchronization priority that is lower than the first synchronization priority. The one or more rules corresponding to the second synchronization priority may comprise a rule allowing the wireless device to drop a first amount of sidelink synchronization signal transmissions for the purpose of detecting incoming synchronization signals. The first amount may comprise one of a first fraction of sidelink synchronization signal transmissions and a first number of sidelink synchronization signal transmissions within a period of time. A third synchronization source may have a third synchronization priority that is lower than the first and second synchronization priorities. The one or more rules corresponding to the third synchronization priority may comprise a rule allowing the wireless device to drop a second amount of sidelink synchronization signal transmissions for the purpose of detecting incoming synchronization signals, wherein the second amount is greater than the first amount.

In certain embodiments, the synchronization source may comprise one of: a Global Navigation Satellite System (GNSS) signal; a network node signal; and a sidelink synchronization signal. In certain embodiments, the synchronization source may be the GNSS signal. The GNSS signal may have a higher synchronization priority than the network node signal and the sidelink synchronization signal. The one or more rules corresponding to the synchronization priority of the GNSS signal may comprise a rule prohibiting the wireless device from dropping transmissions of sidelink synchronization signals for the purpose of detecting incoming synchronization signals, and dropping transmissions of sidelink synchronization signals according to the determined one or more rules for dropping transmissions of sidelink synchronization signals may comprise not dropping transmissions of sidelink synchronization signals for the purpose of detecting incoming synchronization signals.

In certain embodiments, the one or more rules for dropping sidelink synchronization signal transmissions may comprise a rule allowing the wireless device to drop an amount of sidelink synchronization signal transmissions during a period of time. In some cases, the period of time may be equal to or greater than a periodicity with which one or more external synchronization sources generate sidelink synchronization signals. In some cases, a periodicity with which one or more external synchronization sources generate sidelink synchronization signals may be known by the wireless device, and the period of time may be less than the periodicity with which one or more external synchronization sources generate synchronization signals.

Also disclosed is a wireless device. The wireless device comprises one or more processors. The one or more processors are configured to determine a synchronization source for the wireless device. The one or more processors are configured to determine a synchronization priority of the synchronization source. The one or more processors are configured to determine one or more rules for dropping transmissions of sidelink synchronization signals, the one or more rules corresponding to the synchronization priority of the synchronization source. The one or more processors are configured to drop transmissions of sidelink synchronization signals according to the determined one or more rules for dropping transmissions of sidelink synchronization signals.

Also disclosed is a method in a network node. The method comprises defining one or more rules for dropping transmissions of sidelink synchronization signals by a wireless device, the one or more rules corresponding to a synchronization priority of a synchronization source. The method comprises communicating information about the defined one or more rules for dropping transmissions of sidelink synchronization signals to the wireless device.

In certain embodiments, the method may comprise determining a synchronization priority for one or more synchronization sources the synchronization priority of the synchronization source determined based on an accuracy level of the synchronization source.

In certain embodiments, a first synchronization source may have a first synchronization priority. The defined one or more rules corresponding to the first synchronization priority may comprise a rule prohibiting the wireless device from dropping transmissions of sidelink synchronization signals for the purpose of detecting incoming synchronization signals. A second synchronization source may have a second synchronization priority that is lower than the first synchronization priority. The defined one or more rules corresponding to the second synchronization priority may comprise a rule allowing the wireless device to drop a first amount of sidelink synchronization signal transmissions for the purpose of detecting incoming synchronization signals. The first amount may comprise one of a first fraction of sidelink synchronization signal transmissions and a first number of sidelink synchronization signal transmissions within a period of time. In certain embodiments, a third synchronization source may have a third synchronization priority that is lower than the first and second synchronization priorities. The defined one or more rules corresponding to the third synchronization priority may comprise a rule allowing the wireless device to drop a second amount of sidelink synchronization signal transmissions for the purpose of detecting incoming synchronization signals. The second amount may be greater than the first amount.

In certain embodiments, the synchronization source may comprise one of: a Global Navigation Satellite System (GNSS) signal; a network node signal; and a sidelink synchronization signal. In certain embodiments, the synchronization source may be the GNSS signal. The GNSS signal may have a higher synchronization priority than the network node signal and the sidelink synchronization signal. The defined one or more rules corresponding to the synchronization priority of the GNSS signal may comprise a rule prohibiting the wireless device from dropping transmissions of sidelink synchronization signals for the purpose of detecting incoming synchronization signals.

In certain embodiments, the defined one or more rules for dropping sidelink synchronization signal transmissions may comprise a rule allowing the wireless device to drop an amount of sidelink synchronization signal transmissions during a period of time. In certain embodiments, the period of time may be equal to or greater than a periodicity with which one or more external synchronization sources generate sidelink synchronization signals. In certain embodiments, a periodicity with which one or more external synchronization sources generate sidelink synchronization signals may be known by the wireless device, and the period of time may be less than the periodicity with which one or more external synchronization sources generate synchronization signals.

Also disclosed is a network node. The network node comprises one or more processors. The one or more processors are configured to define one or more rules for dropping transmissions of sidelink synchronization signals by a wireless device, the one or more rules corresponding to a synchronization priority of a synchronization source. The one or more processors are configured to communicate information about the defined one or more rules for dropping transmissions of sidelink synchronization signals to the wireless device.

Certain embodiments of the present disclosure may provide one or more technical advantages. For example, certain embodiments may advantageously improve the accuracy of synchronization references that are broadcasted/acquired using a distributed synchronization protocol by ensuring that wireless devices with access to an external, reliable source of synchronization relay it. As another example, certain embodiments may advantageously improve the time required for synchronization for wireless devices that rely exclusively on signals broadcasted from other wireless devices by increasing the time such wireless devices spend on receiving signals from other wireless devices. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
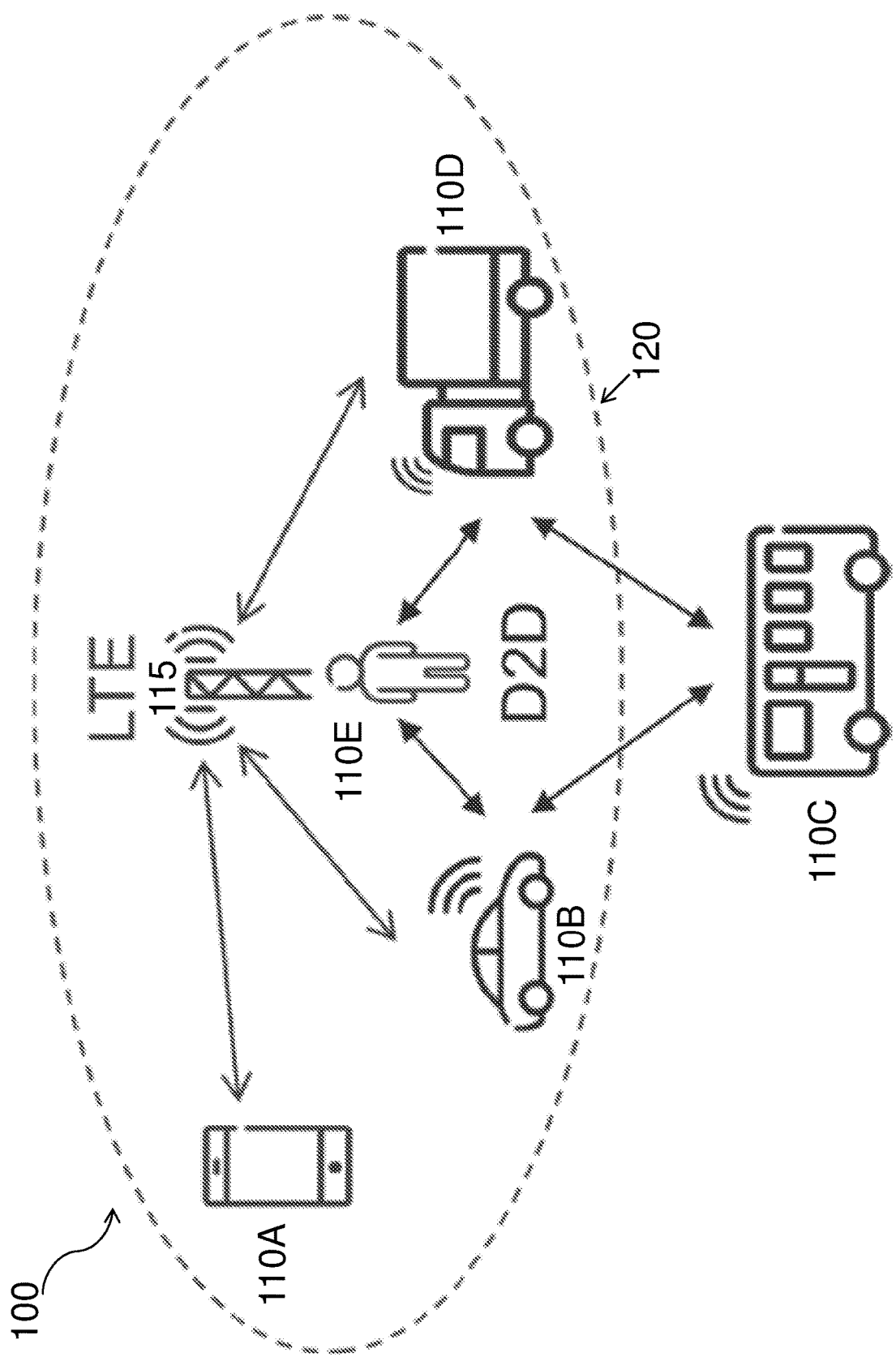
FIG. 1 is a block diagram illustrating an embodiment of a wireless communications network, in accordance with certain embodiments.

Synchronization is currently being discussed in the 3rd Generation Partnership Project (3GPP) for V2x communications, and in particular for V2V. There is general agreement that support for several sources of synchronization may be necessary in order to provide services in different scenarios (e.g., with network coverage, without network coverage but with GNSS coverage, without GNSS or network coverage, etc.). The different sources of synchronization have different levels of accuracy (which may interchangeably referred to herein as degree of accuracy), and place different requirements on the wireless devices.

One possibility that is being considered is to use a distributed protocol similar to the one in Release 12/13 to establish synchronization in the network. This protocol allows for synchronization of wireless devices even when some and/or all of them lack both network and GNSS coverage. The distributed protocol requires wireless devices to periodically transmit specific signals, known as Sidelink Synchronization Signals (SLSS). These are transmitted together with the Physical Sidelink Broadcast Channel (PSBCH), which also conveys some information related to synchronization (e.g., in-coverage flag bit). Using this protocol, wireless devices with access to accurate synchronization sources can relay their synchronization references to other wireless devices (e.g., to wireless devices without GNSS/network coverage). If no wireless device has access to an accurate synchronization source, the protocol still allows for establishing ad-hoc synchronization.

The sources for deriving synchronization being considered include GNSS signals, network node (e.g., eNB) signals, and/or wireless device signals transmitted using a distributed protocol similar to the one in Release 12/13 sidelink. One example of the distributed protocol is SLSS based synchronization, which refers to a device synchronizing to one or more other devices by reading synchronization signals transmitted by such devices.

In order to acquire and/or maintain synchronization, wireless devices are allowed to drop a percentage of transmissions. When allowing all wireless devices to drop sidelink transmissions (e.g., synchronization signals) in the same way as in Release 12/13 sidelink, however, certain problems may arise. First, wireless devices that have access to reliable sources of synchronization stop transmitting synchronization signals that are very necessary for the network to function correctly. Second, wireless devices that have access to no source of synchronization spend time broadcasting a synchronization reference that is most likely not aligned with those used by the rest. If the percentage of transmissions that can be dropped is reduced, then the first problem becomes less of a problem—the second problem, however, becomes more severe. At the other extreme, if the percentage of transmissions that can be dropped is increased, then the second problem is solved—but the first becomes more serious.

The present disclosure contemplates various embodiments that may address these and other deficiencies associated with existing approaches. In certain embodiments, this is achieved by enabling a wireless device to adapt its behavior to the type of synchronization reference (i.e., synchronization source) being used at a given time, with different rules for dropping sidelink transmissions defined for wireless devices with access to different synchronization sources. Different synchronization sources may have different synchronization priorities, which may be used to determine the behavior of the wireless device with respect to dropping transmissions of synchronization signals. In some cases, the synchronization priority of a synchronization source may be based on the accuracy level of the synchronization source. Different synchronization sources may have different levels of accuracy.

According to one example embodiment, a method in a network node is disclosed. The network node defines one or more rules for dropping transmissions of sidelink synchronization signals by a wireless device. The one or more rules correspond to a synchronization priority of a synchronization source. The network node communicates information about the defined one or more rules for dropping transmissions of sidelink synchronization signals to the wireless device.

According to another example embodiment, a method in a wireless device is disclosed. The wireless device determines a synchronization source for the wireless device, and determines a synchronization priority of the synchronization source. The wireless device determines one or more rules for dropping transmissions of sidelink synchronization signals. The one or more rules may correspond to the synchronization priority of the synchronization source. The wireless device drops transmissions of sidelink synchronization signals according to the determined one or more rules for dropping transmissions of sidelink synchronization signals.

Certain embodiments of the present disclosure may provide one or more technical advantages. For example, certain embodiments may advantageously improve the accuracy of synchronization references that are broadcasted/acquired using a distributed synchronization protocol by ensuring that wireless devices with access to an external, reliable source of synchronization relay it. As another example, certain embodiments may advantageously improve the time required for synchronization for wireless devices that rely exclusively on signals broadcasted from other wireless devices (i.e., relying on the distributed protocol alone) by increasing the time such wireless devices spend on receiving signals from other wireless devices. Other advantages may be readily apparent to one having skill in the art. Certain embodiments may have none, some, or all of the recited advantages.

FIG. 1 is a block diagram illustrating an embodiment of a wireless communications network 100, in accordance with certain embodiments. Network 100 includes one or more wireless device(s) 110 (which may be interchangeably referred to as UEs 110) and network node(s) 115 (which may be interchangeably referred to as eNBs 115). More particularly, wireless device 110A is a smart phone, wireless devices 110B-D are vehicles, and wireless device 110E is a pedestrian having a wireless device 110, such as, for example, a smart phone. Wireless devices 110 may communicate with a network node 115, or with one or more other wireless devices 110 over a wireless interface. For example, wireless device 110A, 110B, and 110D may transmit wireless signals to network node 115 and/or receive wireless signals from network node 115. Wireless devices 110 may also transmit wireless signals to other wireless devices 110 and/or receive wireless signals from other wireless devices 110. For example, wireless devices 110B, 110C, 110D, and 110E may communicate using D2D communication. The wireless signals may contain voice traffic, data traffic, control signals, and/or any other suitable information. In some embodiments, an area of wireless signal coverage associated with a network node 115 may be referred to as a cell 120.

In certain embodiments, network node 115 may interface with a radio network controller. The radio network controller may control network node 115 and may provide certain radio resource management functions, mobility management functions, and/or other suitable functions. In some cases, the functionality of the radio network controller may be included in network node 115. The radio network controller may interface with a core network node. In certain embodiments, the radio network controller may interface with the core network node via an interconnecting network. The interconnecting network may refer to any interconnecting system capable of transmitting audio, video, signals, data, messages, or any combination of the preceding. The interconnecting network may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node may manage the establishment of communication sessions and various other functionalities for wireless device 110. Wireless device 110 may exchange certain signals with the core network node using the non-access stratum layer. In non-access stratum signaling, signals between wireless device 110 and the core network node may be transparently passed through the radio access network.

As described above, example embodiments of network 100 may include one or more wireless devices 110, and one or more different types of network nodes capable of communicating (directly or indirectly) with wireless devices 110.

In some embodiments, the non-limiting term "wireless device" or "UE" is used. Wireless devices 110 described herein can be any type of wireless device capable of communicating with network node(s) 115 or another wireless device over radio signals. Wireless device 110 may also be a radio communication device, target device, D2D UE, machine-type-communication UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), etc. Wireless device 110 may operate under either normal coverage or enhanced coverage with respect to its serving cell. The enhanced coverage may be interchangeably referred to as extended coverage. Wireless device 110 may also operate in a plurality of coverage levels (e.g., normal coverage, enhanced coverage level 1, enhanced coverage level 2, enhanced coverage level 3 and so on). In some cases, wireless device 110 may also operate in out-of-coverage scenarios.

Also, in some embodiments generic terminology, "network node" is used. It can be any kind of network node, which may comprise a roadside unit (RSU), base station (BS), radio base station, Node B, base station (BS), multi-standard radio (MSR) radio node such as MSR BS, evolved Node B (eNB), network controller, radio network controller (RNC), base station controller (BSC), relay node, relay donor node controlling relay, base transceiver station (BTS), access point (AP), radio access point, transmission points, transmission nodes, Remote Radio Unit (RRU), Remote Radio Head (RRH), nodes in distributed antenna system (DAS), Multi-cell/multicast Coordination Entity (MCE), core network node (e.g., MSC, MME, etc.), O&M, OSS, SON, positioning node (e.g., E-SMLC), MDT, or any other suitable network node.

The terminology such as network node and wireless device should be considered non-limiting and does in particular not imply a certain hierarchical relation between the two; in general "eNB" could be considered as device 1 and "wireless device" device 2, and these two devices communicate with each other over some radio channel.

Example embodiments of wireless device 110, network node 115, and other network nodes (such as radio network controller or core network node) are described in more detail with respect to FIGS. 6-10 described below.

As described above, V2x communication may include any combination of direct communication between vehicles, pedestrians, and infrastructure. FIG. 1 illustrates a variety of V2x scenarios in which the various embodiments of the present disclosure may be applied. As an example of V2I communication, wireless device 110A, 110B, and 110D may communicate wirelessly with network node 115. As an example of V2P communication, wireless devices 110B and 110D may communicate with a pedestrian having a wireless device 110E. As an example of V2V communication, wireless devices 110B, 110C, and 110D may communicate wirelessly with each other. Although certain embodiments may be described in the context of V2x applications, the various embodiments may be advantageously applied to other applications.

Although FIG. 1 illustrates a particular arrangement of network 100, the present disclosure contemplates that the various embodiments described herein may be applied to a variety of networks having any suitable configuration. For example, network 100 may include any suitable number of wireless devices 110 and network nodes 115, as well as any additional elements suitable to support communication between wireless devices or between a wireless device and another communication device (such as a landline telephone). Furthermore, although certain embodiments may be described in the context of LTE networks, the present disclosure contemplates that the various embodiments may be applied to LTE evolution or to any other wireless systems. The various embodiments described herein may be implemented in any appropriate type of telecommunication system supporting any suitable communication standards (including 5G standards) and using any suitable components, and are applicable to any radio access technology (RAT) or multi-RAT systems in which the wireless device receives and/or transmits signals (e.g., data). For example, the various embodiments described herein may be applicable to LTE, LTE-Advanced, 5G, UMTS, HSPA, GSM, cdma2000, WCDMA, WiMax, UMB, WiFi, another suitable radio access technology, or any suitable combination of one or more radio access technologies.

Although the various embodiments may be described in the context of D2D (sometimes referred to as sidelink, peer to peer, ProSe) and particularly V2V, they can be applied to communication among any type of nodes relying on a distributed synchronization protocol. Moreover, although the various embodiments described herein relate generally to the synchronization of radio communication networks with the participation of vehicles, the various embodiments may be applied to cellular or direct communication in general.

As described above, the synchronization protocol requires a certain wireless device (e.g., wireless device 110B) to listen to the synchronization signals of other wireless devices 110 in order to synchronize with them. At the same time, however, wireless device 110B needs to transmit sidelink synchronization signals so that other wireless devices 110 can synchronize with it. Since most wireless devices 110 only have half-duplex capabilities within the sidelink band, simultaneous transmission and reception of sidelink synchronization signals is not possible. To deal with this problem, a Release 12/13 wireless device is allowed to drop a percentage of its transmissions.

According to specifications, each wireless device 110 participating in the distributed synchronization protocol is allowed to drop a certain fraction of its transmissions. For example, wireless device 110D may participate in the distributed synchronization protocol and drop a certain fraction of its transmissions in order to scan for synchronization signals transmitted by other wireless devices 110. This type of operation is sometimes referred to as a "silent period." In some cases, the type of transmissions that may be dropped may be limited to certain types of signals (e.g., only sidelink transmissions).

The length of the silent period may be determined in any suitable manner. As one example, the length of the silent period may be determined autonomously by wireless device 110D based on any suitable criteria. As another example, the length of the silent period may be determined by another network entity, such as network node 115 or another wireless device 110 and communicated to wireless device 110D. The length of the "silent period" (i.e., the number of subframes that a wireless device can use for detecting incoming synchronization signals) should be long enough to allow for reliable detection of an incoming synchronization signal with unknown timing. The length of the silent period should at least match the timing ambiguity (with respect to the synchronization reference used by the wireless device) of the potentially incoming synchronization signal. Silent periods may occur periodically in order to allow the receiver to update its set of detected synchronization sources. The silent period does not need to be contiguous in time, but it can be obtained by composing interleaved shorter silent periods.

The Release 12/13 protocol defines hierarchical rules describing how to prioritize different external synchronization sources detected by wireless devices 110. The synchronization procedure, however, does not optimize the wireless device behavior in terms of silent period lengths for the different scenarios described above. It is thus desirable to modify the distributed protocol to improve synchronization among all wireless devices 110 in communication range. The various embodiments described herein propose different types of behavior for wireless devices 110 based on a synchronization priority of their available synchronization sources (which may be interchangeably referred to as synchronization references). Thus, the various embodiments described herein may advantageously adapt the behavior of wireless devices 110 to the type of synchronization reference used at a given time. Adapting the behavior of the wireless device to the type of synchronization reference it uses at a given time may advantageously improve the performance of a distributed synchronization protocol.

For example, assume wireless device 110B is synchronized to a synchronization source that has a high synchronization priority (e.g., a synchronization source that has a high level of accuracy, such as a GPS or network node 115 in FIG. 1). When synchronized to a synchronization source having a high synchronization priority, wireless device 110B is primarily interested in sharing its synchronization reference with other wireless devices 110 in proximity (e.g., wireless device 110C, 110D, 110E). In such a scenario, however, wireless device 110B is not interested in receiving synchronization signals from synchronization sources having a lower synchronization priority (e.g., a synchronization source with lower accuracy, such as other wireless devices 110). This is not necessarily the case for all wireless devices 110. Rather, other wireless devices 110 may have different needs depending on the type of synchronization source being used.

As one example, wireless device 110C may be synchronized to a different synchronization source than wireless device 110B. The synchronization source for wireless device 110C may have a lower synchronization priority than the synchronization source used by wireless device 110B. As one example, wireless device 110C may rely on sidelink synchronization signals received from other wireless devices 110 as its synchronization source (for example, sidelink synchronization signals relayed from wireless devices 110B or 110D). Unlike wireless device 110B described above, wireless device 110C is in a position to benefit from receiving synchronization signals from other synchronization sources. Thus, wireless device 110C needs to maintain this synchronization reference—but it is also interested in relaying farther the synchronization signal so that other wireless devices 110 can synchronize too.

As another example, wireless device 110C may rely on its internal clock as a synchronization reference. In some cases, the synchronization priority of synchronization based on an internal clock of a wireless device may have a lower synchronization priority than other possible synchronization sources, such as GNSS signals, signals from network node 115 or even synchronization signals received from other wireless devices 110. In such a case, wireless device 110C is in a position to benefit from receiving synchronization signals from other synchronization sources. Thus, wireless device 110C is mostly interested in acquiring the synchronization reference of other wireless devices 110, and not interested in relaying farther the synchronization signal based on its own internal clock.

As illustrated by the above examples, the appropriate behavior of a wireless device with respect to synchronization may vary according to its synchronization source. More particularly, it is desirable that wireless devices using a synchronization source with a high synchronization priority behave differently with respect to dropping sidelink synchronization transmissions than wireless devices using a synchronization source with a lower synchronization priority. The various embodiments described herein may advantageously adapt the behavior of wireless devices 110 based on their synchronization sources, for example based on the synchronization priorities of the synchronization sources of wireless devices 110.

According to one example embodiment, network node 115 may define one or more rules for dropping transmissions of sidelink synchronization signals by wireless devices 110. Network node 115 may define the one or more rules for dropping transmissions of sidelink synchronization signals by wireless devices 110 in any suitable manner. The one or more rules may be based on any suitable criteria. In some cases, the one or more rules may correspond to a synchronization priority of a synchronization source. In some cases, the one or more rules may be defined based on an accuracy level of the synchronization source. In certain embodiments, the one or more rules may be a function of the synchronization reference type and not the synchronization priority. In some cases, the one or more rules may be defined based on a combination of the above.

To illustrate, assume that wireless devices 110 may use one of three different synchronization sources for synchronization: a first synchronization source, a second synchronization source, and a third synchronization source. In certain embodiments, the first synchronization source may be GNSS signals, the second synchronization source may be signals from network node 115 (e.g., an eNB 115), and the third synchronization source may be sidelink synchronization signals transmitted by other wireless devices 110. The first synchronization source has a first synchronization priority, the second synchronization source has a second synchronization priority, and the third synchronization source has a third synchronization priority. For purposes of example, the first synchronization priority is higher than the second and third synchronization priorities, and the second synchronization priority is higher than the third synchronization priority.

In such a scenario, network node 115 may define one or more rules for dropping transmissions of sidelink synchronization signals by wireless devices 110 that correspond to the synchronization priority of the synchronization source. For example, the defined one or more rules corresponding to the first synchronization priority may comprise a rule prohibiting a wireless device 110 from dropping transmissions of sidelink synchronization signals for the purpose of detecting incoming synchronization signals. As another example, the defined one or more rules corresponding to the second synchronization priority may comprise a rule allowing a wireless device 110 to drop a first amount of sidelink synchronization signal transmissions for the purpose of detecting incoming synchronization signals. As another example, the defined one or more rules corresponding to the third synchronization source may comprise a rule allowing a wireless device 110 to drop a second amount of sidelink synchronization signal transmissions for the purpose of detecting incoming synchronization signals. The second amount may be greater than the first amount.

Network node 115 communicates information about the defined one or more rules for dropping transmissions of sidelink synchronization signals to wireless devices 110. Network node 115 may communicate information about the defined one or more rules for dropping transmissions of sidelink synchronization signals to wireless devices 110 in any suitable manner. For example, in some cases network node 115 may send the information about the defined one or more rules for dropping transmissions of sidelink synchronization signals to wireless devices 110 using any suitable type of signaling. The information about the defined one or more rules may be any suitable information. For example, in certain embodiments the information about the defined one or more rules may comprise the rules themselves. As another example, in certain embodiments the one or more rules may be predefined, and the information about the defined one or more rules may comprise an indication of which of the predefined one or more rules for dropping transmissions of sidelink synchronization signals should be applied by the wireless device 110.

The synchronization priority of a synchronization source may be determined in any suitable manner by any suitable network entity. For example, in certain embodiments the synchronization priority of a synchronization source may be determined by network node 115, a wireless device 110, or another suitable network entity. The synchronization priority of a synchronization source may be statically or dynamically defined. The synchronization priority of a synchronization source may be determined based on any suitable criteria. As one example, in certain embodiments the synchronization priority of a synchronization source may be based on an accuracy level of the synchronization source. The accuracy level of the synchronization source refers to the accuracy of the synchronization experienced by a receiver when obtaining synchronization from a certain synchronization source. The accuracy level of the synchronization source may be based on any suitable criteria. For example, in certain embodiments the accuracy level of a synchronization source may be based on one or more of: an accuracy of the synchronization source itself; processing at the receiver; and other aspects related to, for example, radio propagation.

In certain embodiments, the accuracy of a synchronization source may be determined relative to other possible synchronization sources. For example, a synchronization source that is more accurate than other possible synchronization sources may have a high level of accuracy, a synchronization source that is more accurate than some possible synchronization sources but less accurate that other possible synchronization sources may have a moderate level of accuracy, and a synchronization source that is less accurate than other possible synchronization sources may have a low level of accuracy. In such a case, synchronization sources having a high level of accuracy may be assigned a higher synchronization priority than synchronization sources having a moderate degree of accuracy and a low degree of accuracy, while synchronization sources having a moderate degree of accuracy may be assigned higher synchronization priorities than synchronization sources having a low degree of accuracy.

In certain embodiments, the determination of a synchronization priority for a synchronization source may take into account factors other than a relative assessment of the accuracy of the synchronization sources. For example, in certain embodiments the synchronization priority of a synchronization source may be based on whether a wireless device 110B is accurately synchronized to the synchronization source. Other criteria may also be taken into account, for example the quality or strength of the synchronization signal used by the wireless device.

Although certain example embodiments may be described using synchronization priorities based on the levels of accuracy of the synchronization sources, the present disclosure is not limited to those example embodiments. Rather, the present disclosure contemplates that the synchronization priorities of a synchronization source may be determined based on any suitable criteria.

According to another example embodiment, a wireless device 110 (e.g., wireless device 110B) determines a synchronization source for wireless device 110B. Wireless device 110B may determine the synchronization source in any suitable manner. For example, wireless device 110B may determine the synchronization source autonomously, or may determine the synchronization source based on information provided from another network entity (e.g., network node 115 or another wireless device 110). In certain embodiments, wireless device 110B may determine whether it is accurately synchronized to the determined synchronization source.

Wireless device 110B determines a synchronization priority of the synchronization source. Wireless device 110B may determine the synchronization priority of the synchronization source in any suitable manner. For example, in certain embodiments wireless device 110B may determine the synchronization priority autonomously. As another example, in certain embodiments wireless device 110B may determine the synchronization priority based on information provided from another network entity (e.g., network node 115 or another wireless device 110).

Wireless device 110B determines one or more rules for dropping transmissions of sidelink synchronization signals. In some cases, the one or more rules may correspond to the synchronization priority of the synchronization source. In some cases, the one or more rules may be a function of the synchronization reference type and not the synchronization priority. In some cases, the one or more rules may be defined based on a combination of the above.

Wireless device 110B may determine the one or more rules for dropping transmissions of sidelink synchronization signals in any suitable manner. As one example, wireless device 110B may autonomously determine the one or more rules for dropping transmissions of sidelink synchronization signals. As another example, wireless device 110B may determine the one or more rules for dropping transmissions of sidelink synchronization signals based on information communicated to wireless device 110B by another network entity (e.g., network node 115 or another wireless device 110). For example, wireless device 110B may receive information about the one or more rules for dropping transmissions of sidelink synchronization signals from one of network node 115 or another wireless device 110. In some cases, network node 115 may send the information to wireless device 110B using any suitable type of signaling. In some cases, the information may comprise the one or more rules for dropping transmissions of sidelink synchronization signals. In some cases, the one or more rules for dropping transmissions of sidelink synchronization signals may be predefined, and the information may comprise an indication of which of the one or more predefined rules wireless device 110B should use for dropping transmissions of sidelink synchronization signals.

Wireless device 110B drops transmissions of sidelink synchronization signals according to the determined one or more rules for dropping transmissions of sidelink synchronization signals. To illustrate, consider the example described above in which a first synchronization source has a first synchronization priority, a second synchronization source has a second synchronization priority, and a third synchronization source has a third synchronization priority. Recall that for purposes of example, the first synchronization priority is higher than the second and third synchronization priorities, and the second synchronization priority is higher than the third synchronization priority.

In the above example scenario, if wireless device 110B determines that its synchronization source is the first synchronization source having the first synchronization priority, wireless device 110B may determine that the corresponding one or more rules for dropping transmissions of sidelink synchronization signals comprise a rule prohibiting wireless device 110B from dropping transmissions of sidelink synchronization signals for the purpose of detecting incoming synchronization signals. In such a scenario, dropping transmissions of sidelink synchronization signals according to the determined one or more rules for dropping transmissions of sidelink synchronization signals may comprise not dropping transmissions of sidelink synchronization signals for the purpose of detecting incoming synchronization signals.

Wireless devices that are synchronized to the first synchronization source (i.e., a synchronization source with a high synchronization priority) may be synchronized to a synchronization source having a high degree of accuracy (e.g., an eNB and/or GNSS signals). When synchronized to a synchronization source having a high synchronization priority, wireless device 110B is primarily interested in sharing its synchronization reference with other wireless devices 110 in proximity, and not interested in receiving synchronization signals from synchronization sources having a lower synchronization priority. Thus, in such a scenario wireless device 110B may not be allowed to drop any of its sidelink transmissions for the purpose of detecting new synchronization sources (e.g., detection of new Sync Ref UEs). In some cases, specifications may allow dropping transmissions for other purposes. In other words, wireless device 110B relays its synchronization reference but does not attempt to re-synchronize based on the distributed protocol.

As another example, if wireless device 110B determines that its synchronization source is the second synchronization source having the second synchronization priority, wireless device 110B may determine that the corresponding one or more rules for dropping transmissions of sidelink synchronization signals comprise a rule allowing wireless device 110B to drop a first amount of sidelink synchronization signal transmissions for the purpose of detecting incoming synchronization signals. In such a scenario, dropping transmissions of sidelink synchronization signals according to the determined one or more rules for dropping transmissions of sidelink synchronization signals may comprise dropping the first amount of sidelink synchronization signal transmissions for the purpose of detecting incoming synchronization signals. In certain embodiments, the first amount may comprise one of a first fraction of sidelink synchronization signal transmissions and a first number of sidelink synchronization signal transmissions within a period of time.

Wireless devices synchronized to the second synchronization source (i.e., a synchronization source with a lower synchronization priority than the first synchronization source and a higher synchronization priority than the third synchronization source) may be synchronized to a synchronization source having a moderate degree of accuracy (e.g., based on sidelink synchronization signals transmitted by other wireless devices 110). When synchronized to a synchronization source having a moderate synchronization priority, wireless device 110B needs to maintain this synchronization reference—but it is also interested in relaying farther the synchronization signal so that other wireless devices 110 can synchronize too. Thus, in such a scenario wireless device 110B may be allowed to drop the first amount of sidelink synchronization signal transmissions for the purpose of detecting incoming synchronization signals.

As described above, the first amount may comprise one of a first fraction of sidelink synchronization signal transmissions and a first number of sidelink synchronization signal transmissions within a period of time. For example, in certain embodiments when wireless device 110B has access to a synchronization source with a moderate degree of accuracy (e.g., derived from another wireless device 110 that has access to a reliable source of synchronization), wireless device 110B is allowed to drop a fraction $F_1$ of its transmissions (or equivalently a certain amount of transmissions T1 within a certain period T2). In other words, wireless device 110B is expected to transmit its own synchronization signals (possibly subject to further conditions for synchronization signals transmission), but also needs to regularly scan for synchronization signals transmitted by other devices (e.g., wireless devices, eNBs, other nodes) in proximity. The amount transmissions that wireless device 110B is allowed to drop may be based on any suitable criteria. For example, in certain embodiments the fraction of transmissions that wireless device 110B is allowed to drop may be a function of network configuration. For example, if the network configures all devices to synchronize according to a certain common absolute timing (based, for example, on UTC) the dropping can be optimized to a window centered around the reference timing. Wireless devices that have access to a synchronization source with a low accuracy (e.g., based on internal clock) are allowed to drop a larger fraction $F_2 > F_1$ of their transmissions. That is, these wireless devices broadcast their synchronization reference but they also try to acquire a (new) synchronization reference from other wireless devices.

As another example, if wireless device 110B determines that its synchronization source is the third synchronization source having the third synchronization priority, wireless device 110B may determine that the corresponding one or more rules for dropping transmissions of sidelink synchronization signals comprise a rule allowing wireless device 110B to drop a second amount of sidelink synchronization signal transmissions for the purpose of detecting incoming synchronization signals. The second amount may be greater than the first amount described above. In such a scenario, dropping transmissions of sidelink synchronization signals according to the determined one or more rules for dropping transmissions of sidelink synchronization signals may comprise dropping the second amount of sidelink synchronization signal transmissions for the purpose of detecting incoming synchronization signals. In certain embodiments, the second amount may comprise one of a second fraction of sidelink synchronization signal transmissions and a second number of sidelink synchronization signal transmissions within the period of time.

Wireless devices that are synchronized to the third synchronization source (i.e., a synchronization source with a lower synchronization priority than the first and second synchronization sources) may be synchronized to a synchronization source having a low degree of accuracy (e.g., using the internal clock of the wireless device as a synchronization reference). When synchronized to a synchronization source having a low synchronization priority, wireless device 110B is in a position to benefit from receiving synchronization signals from other synchronization sources, and is mostly interested in acquiring the synchronization reference of other wireless devices 110. Thus, in such a scenario wireless device 110B may be allowed to drop the second amount of sidelink synchronization signal transmissions for the purpose of detecting incoming synchronization signals.

As described above, the second amount may comprise one of a second fraction of sidelink synchronization signal transmissions and a second number of sidelink synchronization signal transmissions within the period of time. For example, in certain embodiments when wireless device 110B that has access to a synchronization source with a low level accuracy (e.g., based on an internal clock of wireless device 110B), wireless device 110B is allowed to drop a larger fraction $F_2 > F_1$ of its transmissions. In other words, wireless device 110B broadcasts its synchronization reference but also tries to acquire a (new) synchronization reference from other wireless devices 110. The fraction of transmissions that wireless device 110B is allowed to drop may be based on any suitable criteria. As described above, in certain embodiments the amount of transmissions that wireless device 110B is allowed to drop may be a function of network configuration. For example, if the network configures all devices to synchronize according to a certain common absolute timing (based, for example, on UTC) the dropping can be optimized to a window centered around the reference timing. Wireless devices that have access to a synchronization source with a low accuracy (e.g., based on internal clock) are allowed to drop a larger fraction $F_2 > F_1$ of their transmissions. That is, these wireless devices broadcast their synchronization reference but they also try to acquire a (new) synchronization reference from other wireless devices.

As a more particular example, assume that a V2V UE (e.g., wireless device 110B) determines that its synchronization source is GNSS. In such a scenario, wireless device 110B may determine that GNSS has higher synchronization priority than SLSS-based synchronization. Wireless device 110B may also determine that it is accurately synchronized to the GNSS synchronization source. In such a case, the one or more rules for dropping sidelink transmissions may comprise a rule that wireless device 110B is not allowed to drop sidelink transmissions for the purpose of detection of new synchronization sources (e.g., Sync Ref UEs).

Thus, in certain embodiments the behavior of wireless devices 110 in terms of allowed packet dropping (i.e., sidelink synchronization signal transmissions) depends on its synchronization state. Although certain example embodiments have described a wireless device as associated with a particular synchronization source having a particular synchronization priority, the present disclosure contemplates that wireless devices may change the synchronization state they belong to at some point. For example, wireless device 110E may initially use GNSS as its synchronization source. As described above, as a synchronization source GNSS has a high degree of accuracy and therefore may have a higher synchronization priority than other possible synchronization sources. During the time period in which wireless device 110E uses GNSS as its synchronization source, wireless device 110E may drop transmissions according to a rule corresponding to the high synchronization priority (e.g., by not dropping transmissions of sidelink synchronization signals for the purpose of detecting incoming synchronization signals). Subsequently, however, wireless device 110E may lose GNSS coverage and begin using a different synchronization source (e.g., sidelink synchronization signals transmitted by other wireless devices having only a moderate degree of accuracy and therefore a lower synchronization priority). During the time period in which wireless device 110E uses sidelink synchronization signals transmitted by other wireless devices 110 as its synchronization source, wireless device 110E may drop transmissions according to a rule corresponding to the synchronization priority of the new synchronization source (e.g., by dropping a first amount of sidelink synchronization signal transmissions for the purpose of detecting incoming synchronization signals).

Although in certain embodiments the rule for dropping transmissions has been described in terms of a percentage (e.g., a wireless device is allowed to drop up to a certain percentage of transmissions), the present disclosure is not limited to these example embodiments. Different rules may be applied following the same principle. Similarly, although some embodiments have been described in the context of three synchronization priorities corresponding to three synchronization sources, the present disclosure is not limited to these example embodiments. Rather, the present disclosure contemplates that any suitable number of synchronization sources and synchronization priorities may be used. The present disclosure contemplates any suitable number of possible synchronization sources. For example, in some embodiments, more or less than three synchronization states may be defined. In some cases, each synchronization source may be associated with its own synchronization priority. In some cases, different synchronization sources may have the same synchronization priority.

As described above, some of the wireless devices 110 participating in the distributed synchronization protocol may be allowed to drop a certain fraction of their transmissions in order to scan for synchronization signals transmitted by other wireless devices 110. This type of operation is sometimes referred to as a "silent period." In some cases, the type of transmissions that may be dropped may be limited to certain types of signals (e.g., only sidelink transmissions). The length of the "silent period" (i.e., the number of subframes that a wireless device can use for detecting incoming synchronization signals) should be long enough to allow for reliable detection of an incoming synchronization signal with unknown timing. In general, the length of the silent period should at least match the timing ambiguity (with respect to the synchronization reference used by the wireless device) of the potentially incoming synchronization signal. Silence periods may occur periodically in order to allow the receiver to update its set of detected synchronization sources. The silent period does not need to be contiguous in time, but it can be obtained by composing interleaved shorter silent periods.

The silent period may be allocated in any suitable manner by any suitable network entity. For example, in certain embodiments network node 115 may determine the length of a silent period and communicate it a wireless device 110. As another example, in certain embodiments wireless device 110 may autonomously determine the length of the silent period. In either case, the determination may be based on any suitable criteria, for example whether the timing of the incoming periodic synchronization signal is known to the receiver. Examples of silent period allocation are described in detail below in relation to FIGS. 2 and 3.

Figure 2:
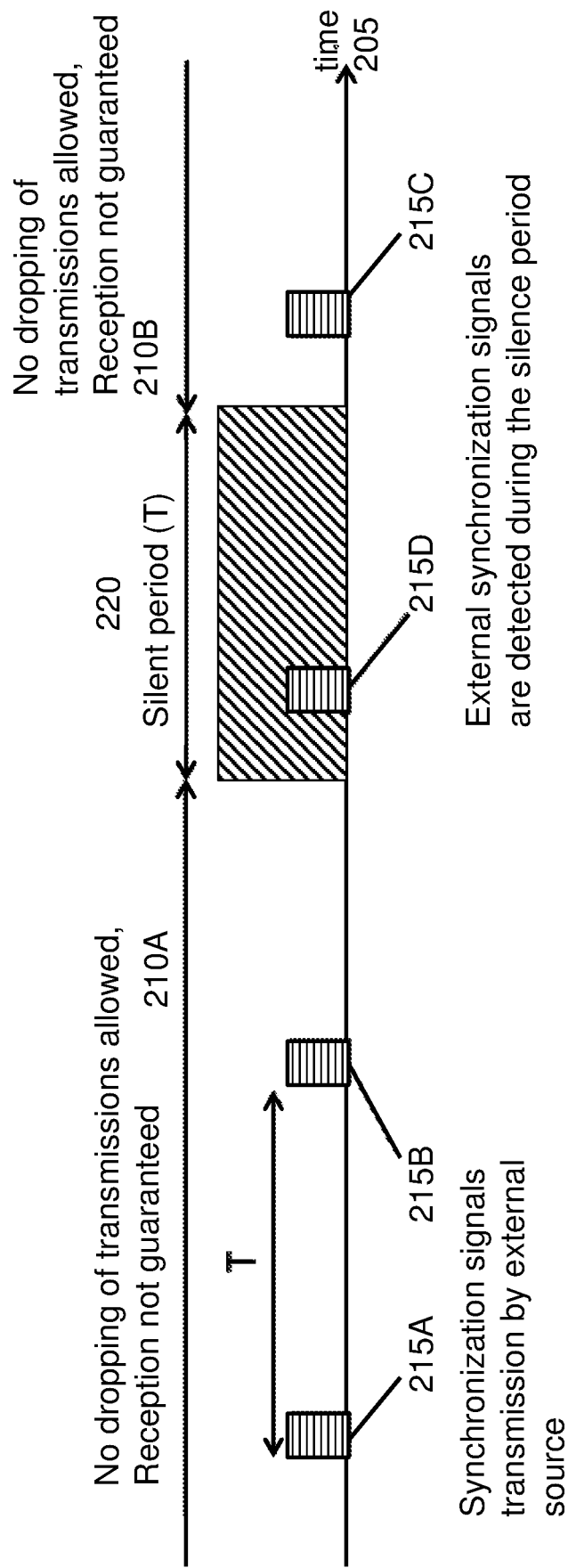
FIG. 2 illustrates an example of silent period allocation in case the timing of the incoming periodic synchronization signal is unknown to the receiver, in accordance with certain embodiments.

FIG. 2 illustrates an example of silent period allocation in case the timing of the incoming periodic synchronization signal is unknown to the receiver, in accordance with certain embodiments. More particularly, FIG. 2 illustrates time along the x-axis 205. During a first period of time 210A, a wireless device, such as wireless device 110 described above in relation to FIG. 1, is not allowed to drop transmissions of sidelink synchronization signals. Thus, reception of sidelink synchronization signals 215A and 215B, which may be transmitted by a source external to the wireless device, is not guaranteed. As described above, this may be due to half-duplex constraints of the wireless device that prevent the wireless device from simultaneously transmitting its own sidelink synchronization signals and receiving sidelink synchronization signals from other sources. Similarly, during a second period of time 210B, the wireless device is not allowed to drop transmissions of sidelink synchronization signals, and therefore reception of sidelink synchronization signal 215C from a source external to the wireless device is not guaranteed.

During silent period 220, however, the wireless device is allowed to drop transmission of sidelink synchronization signals. As a result, the wireless device may advantageously detect sidelink synchronization signal 215D, which may be transmitted by a source external to the wireless device. As described above, in general the length of the silent period should at least match the timing ambiguity (with respect to the synchronization reference used by the wireless device) of the potentially incoming synchronization signal. In the example of FIG. 2, assume that the external synchronization sources generate synchronization signal with periodicity T. Thus, the window for silent period 220 must be at least T in length in order to ensure detection of one synchronization signal from each external synchronization source.

Figure 3:
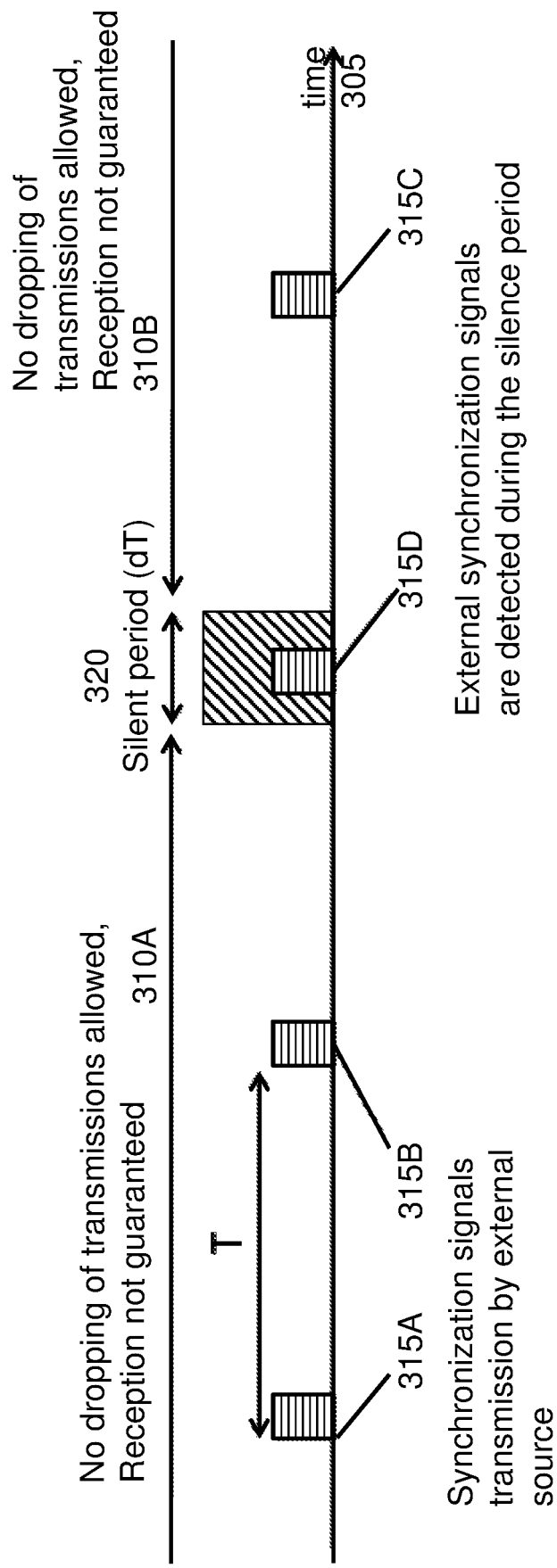
FIG. 3 illustrates an example of silent period allocation in case the timing of the incoming periodic synchronization signal is known to the receiver with limited precision, in accordance with certain embodiments.

FIG. 3 illustrates an example of silent period allocation in case the timing of the incoming periodic synchronization signal is known to the receiver with limited precision, in accordance with certain embodiments. Similar to FIG. 2 described above, FIG. 3 illustrates time along the x-axis 305. A first period of time 310A and a second period of time 310B are shown during which the wireless device is not allowed to drop transmissions of sidelink synchronization signals.

Thus, reception of sidelink synchronization signals 315A and 315B during first period 310A and sidelink synchronization signal 315C during second period 310B is not guaranteed (e.g., due to half-duplex constraints on the wireless device).

During silent period 320, however, the wireless device is allowed to drop an amount of its sidelink synchronization signal transmissions. Thus, during silent period 320 the wireless device is able to detect sidelink synchronization signal 315D, which may be transmitted by an external source during silent period 320. As described above, FIG. 3 illustrates an example in which the timing of the incoming periodic synchronization signal (e.g., sidelink synchronization signal 315D) is known to the receiver with limited precision. More particularly, FIG. 3 illustrates an allocation of silent period 320 in the case where the timing of the incoming periodic synchronization signal is known to the receiver up to an uncertainty dT<T. For example, assume that the external synchronization sources generate synchronization signal with periodicity T. The silent period window must be at least dT in length in order to ensure detection of one sync signal from a certain external synchronization source.

Figure 4:
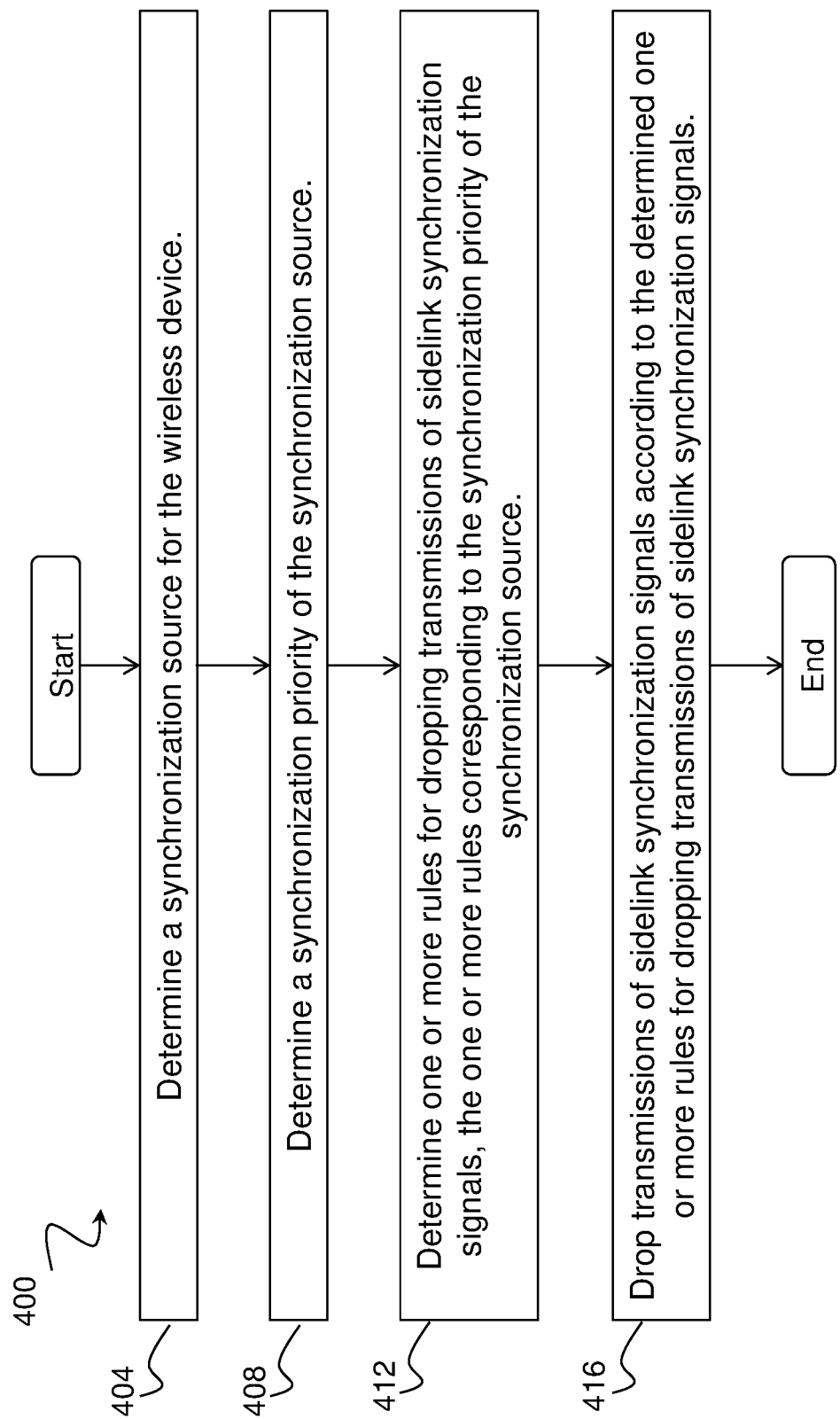
FIG. 4 is a flow chart of a method in a wireless device, in accordance with certain embodiments.

FIG. 4 is a flow diagram of a method in a wireless device, in accordance with certain embodiments. The method begins at step 404, where the wireless device determines a synchronization source for the wireless device. In certain embodiments, the method may comprise determining whether the wireless device is accurately synchronized to the determined synchronization source. In certain embodiments, the synchronization source may comprise one of: a Global Navigation Satellite System (GNSS) signal; a network node signal; and a sidelink synchronization signal.

At step 408, the wireless device determines a synchronization priority of the synchronization source. In certain embodiments, the synchronization priority of the synchronization source may be based on an accuracy level of the synchronization source.

At step 412, the wireless device determines one or more rules for dropping transmissions of sidelink synchronization signals, the one or more rules corresponding to the synchronization priority of the synchronization source. In certain embodiments, determining the one or more rules for dropping transmissions of sidelink synchronization signals may comprise autonomously determining the one or more rules for dropping transmissions of sidelink synchronization signals. In certain embodiments, determining the one or more rules for dropping transmissions of sidelink synchronization signals may comprise receiving information about the one or more rules for dropping transmissions of sidelink synchronization signals from one of a network node or another wireless device.

In certain embodiments, the one or more rules for dropping sidelink synchronization signal transmissions may comprise a rule allowing the wireless device to drop an amount of sidelink synchronization signal transmissions during a period of time. In certain embodiments, the period of time may be equal to or greater than a periodicity with which one or more external synchronization sources generate sidelink synchronization signals. In certain embodiments, a periodicity with which one or more external synchronization sources generate sidelink synchronization signals may be known by the wireless device, and the period of time may be less than the periodicity with which one or more external synchronization sources generate synchronization signals.

At step 416, the wireless device drops transmissions of sidelink synchronization signals according to the determined one or more rules for dropping transmissions of sidelink synchronization signals.

In certain embodiments, a first synchronization source may have a first synchronization priority. The one or more rules corresponding to the first synchronization priority may comprise a rule prohibiting the wireless device from dropping transmissions of sidelink synchronization signals for the purpose of detecting incoming synchronization signals. Upon determining that the synchronization source is the first synchronization source and the synchronization priority is the first synchronization priority, dropping transmissions of sidelink synchronization signals according to the determined one or more rules for dropping transmissions of sidelink synchronization signals may comprise not dropping transmissions of sidelink synchronization signals for the purpose of detecting incoming synchronization signals. In certain embodiments, a second synchronization source may have a second synchronization priority that is lower than the first synchronization priority. The one or more rules corresponding to the second synchronization priority may comprise a rule allowing the wireless device to drop a first amount of sidelink synchronization signal transmissions for the purpose of detecting incoming synchronization signals. The first amount may comprise one of a first fraction of sidelink synchronization signal transmissions and a first number of sidelink synchronization signal transmissions within a period of time. Upon determining that the synchronization source is the first synchronization source and the synchronization priority is the second synchronization priority, dropping transmissions of sidelink synchronization signals according to the determined one or more rules for dropping transmissions of sidelink synchronization signals may comprise dropping the first amount of sidelink synchronization signal transmissions for the purpose of detecting incoming synchronization signals. In certain embodiments, a third synchronization source may have a third synchronization priority that is lower than the first and second synchronization priorities. The one or more rules corresponding to the third synchronization priority may comprise a rule allowing the wireless device to drop a second amount of sidelink synchronization signal transmissions for the purpose of detecting incoming synchronization signals. The second amount may be greater than the first amount. Upon determining that the synchronization source is the third synchronization source and the synchronization priority is the third synchronization priority, dropping transmissions of sidelink synchronization signals according to the determined one or more rules for dropping transmissions of sidelink synchronization signals may comprise dropping the second amount of sidelink synchronization signal transmissions for the purpose of detecting incoming synchronization signals.

In certain embodiments, the synchronization source may be the GNSS signal. The GNSS signal may have a higher synchronization priority than the network node signal and the sidelink synchronization signal. The one or more rules corresponding to the synchronization priority of the GNSS signal may comprise a rule prohibiting the wireless device from dropping transmissions of sidelink synchronization signals for the purpose of detecting incoming synchronization signals. Dropping transmissions of sidelink synchronization signals according to the determined one or more rules for dropping transmissions of sidelink synchronization signals may comprise not dropping transmissions of sidelink synchronization signals for the purpose of detecting incoming synchronization signals.

Figure 5:
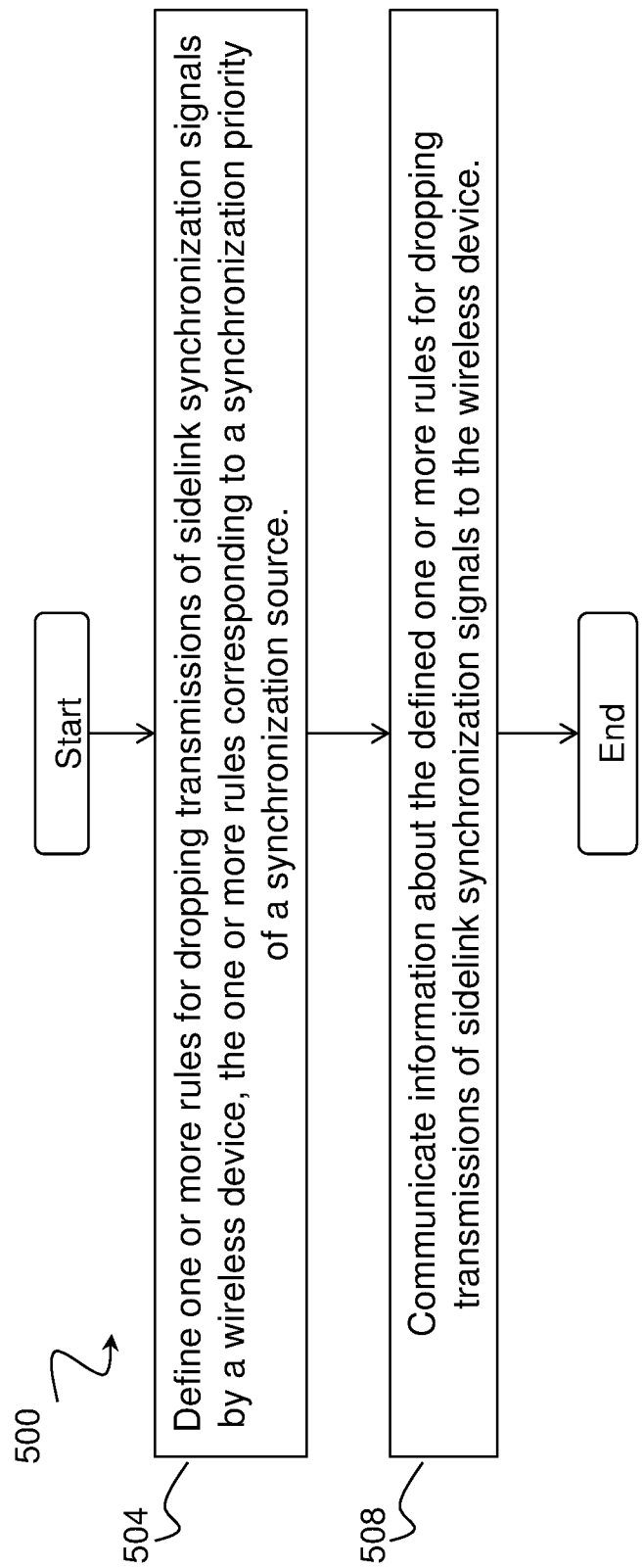
FIG. 5 is a flow chart of a method in a network node, in accordance with certain embodiments.

FIG. 5 is a flow diagram of a method in a network node, in accordance with certain embodiments. The method begins at step 504, where the network node defines one or more rules for dropping transmissions of sidelink synchronization signals by a wireless device, the one or more rules corresponding to a synchronization priority of a synchronization source.

In certain embodiments, a first synchronization source may have a first synchronization priority. The defined one or more rules corresponding to the first synchronization priority may comprise a rule prohibiting the wireless device from dropping transmissions of sidelink synchronization signals for the purpose of detecting incoming synchronization signals. A second synchronization source may have a second synchronization priority that is lower than the first synchronization priority. The defined one or more rules corresponding to the second synchronization priority may comprise a rule allowing the wireless device to drop a first amount of sidelink synchronization signal transmissions for the purpose of detecting incoming synchronization signals. The first amount may comprise one of a first fraction of sidelink synchronization signal transmissions and a first number of sidelink synchronization signal transmissions within a period of time. A third synchronization source may have a third synchronization priority that is lower than the first and second synchronization priorities. The defined one or more rules corresponding to the third synchronization priority may comprise a rule allowing the wireless device to drop a second amount of sidelink synchronization signal transmissions for the purpose of detecting incoming synchronization signals. The second amount may be greater than the first amount.

In certain embodiments, the synchronization source may comprise one of: a Global Navigation Satellite System (GNSS) signal; a network node signal; and a sidelink synchronization signal. In certain embodiments, the synchronization source may be the GNSS signal. The GNSS signal may have a higher synchronization priority than the network node signal and the sidelink synchronization signal. The defined one or more rules corresponding to the synchronization priority of the GNSS signal may comprise a rule prohibiting the wireless device from dropping transmissions of sidelink synchronization signals for the purpose of detecting incoming synchronization signals.

In certain embodiments, the defined one or more rules for dropping sidelink synchronization signal transmissions may comprise a rule allowing the wireless device to drop an amount of sidelink synchronization signal transmissions during a period of time. In some cases, the period of time may be equal to or greater than a periodicity with which one or more external synchronization sources generate sidelink synchronization signals. In some cases, a periodicity with which one or more external synchronization sources generate sidelink synchronization signals may be known by the wireless device, and the period of time may be less than the periodicity with which one or more external synchronization sources generate synchronization signals.

At step 508, the network node communicates information about the defined one or more rules for dropping transmissions of sidelink synchronization signals to the wireless device. In certain embodiments, the method may comprise determining a synchronization priority for one or more synchronization sources the synchronization priority of the synchronization source determined based on an accuracy level of the synchronization source.

Figure 6:
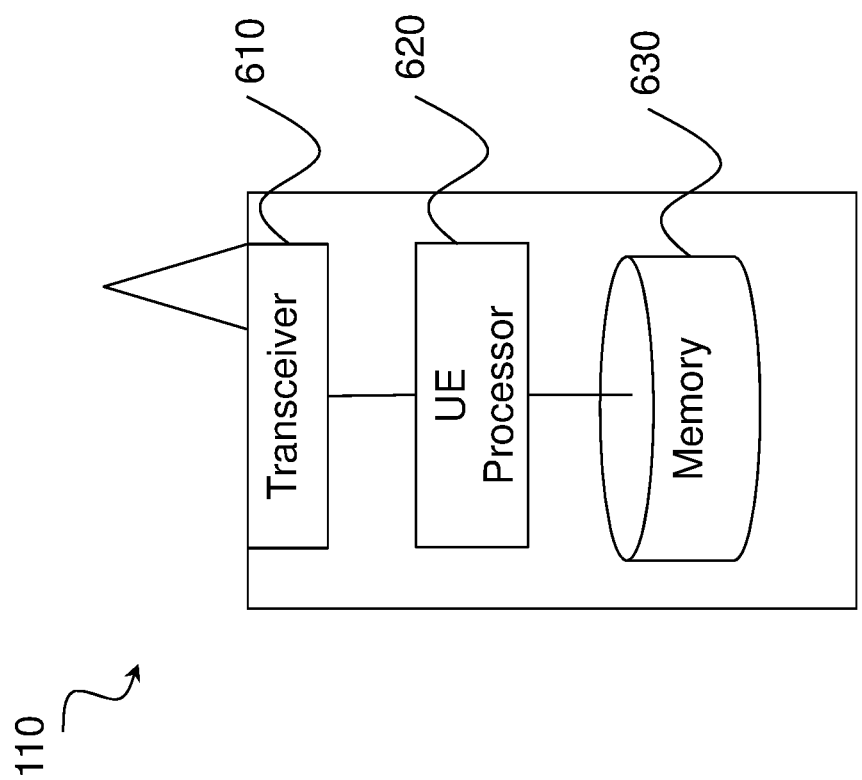
FIG. 6 is a block schematic of an exemplary wireless device, in accordance with certain embodiments.

FIG. 6 is a block schematic of an exemplary wireless device, in accordance with certain embodiments. Wireless device 110 may refer to any type of wireless device communicating with a node and/or with another wireless device in a cellular or mobile communication system. Examples of wireless device 110 include a mobile phone, a smart phone, a PDA (Personal Digital Assistant), a portable computer (e.g., laptop, tablet), a sensor, a modem, a machine-type-communication (MTC) device/machine-to-machine (M2M) device, laptop embedded equipment (LEE), laptop mounted equipment (LME), USB dongles, a D2D capable device, or another device that can provide wireless communication. A wireless device 110 may also be referred to as UE, a station (STA), a device, or a terminal in some embodiments. Wireless device 110 includes transceiver 610, processor 620, and memory 630. In some embodiments, transceiver 610 facilitates transmitting wireless signals to and receiving wireless signals from network node 115 (e.g., via antenna 640), processor 620 executes instructions to provide some or all of the functionality described above as being provided by wireless device 110, and memory 630 stores the instructions executed by processor 620.

Processor 620 may include any suitable combination of hardware and software implemented in one or more modules to execute instructions and manipulate data to perform some or all of the described functions of wireless device 110, such as the functions of wireless device 110 described above in relation to FIGS. 1-5. In some embodiments, processor 620 may include, for example, one or more computers, one or more central processing units (CPUs), one or more microprocessors, one or more applications, one or more application specific integrated circuits (ASICs), one or more field programmable gate arrays (FPGAs) and/or other logic.

Memory 630 is generally operable to store instructions, such as a computer program, software, an application including one or more of logic, rules, algorithms, code, tables, etc. and/or other instructions capable of being executed by a processor. Examples of memory 630 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information, data, and/or instructions that may be used by processor 620.

Other embodiments of wireless device 110 may include additional components beyond those shown in FIG. 6 that may be responsible for providing certain aspects of the wireless device's functionality, including any of the functionality described above and/or any additional functionality (including any functionality necessary to support the solution described above). As just one example, wireless device 110 may include input devices and circuits, output devices, and one or more synchronization units or circuits, which may be part of the processor 620. Input devices include mechanisms for entry of data into wireless device 110. For example, input devices may include input mechanisms, such as a microphone, input elements, a display, etc. Output devices may include mechanisms for outputting data in audio, video and/or hard copy format. For example, output devices may include a speaker, a display, etc.

Figure 7:
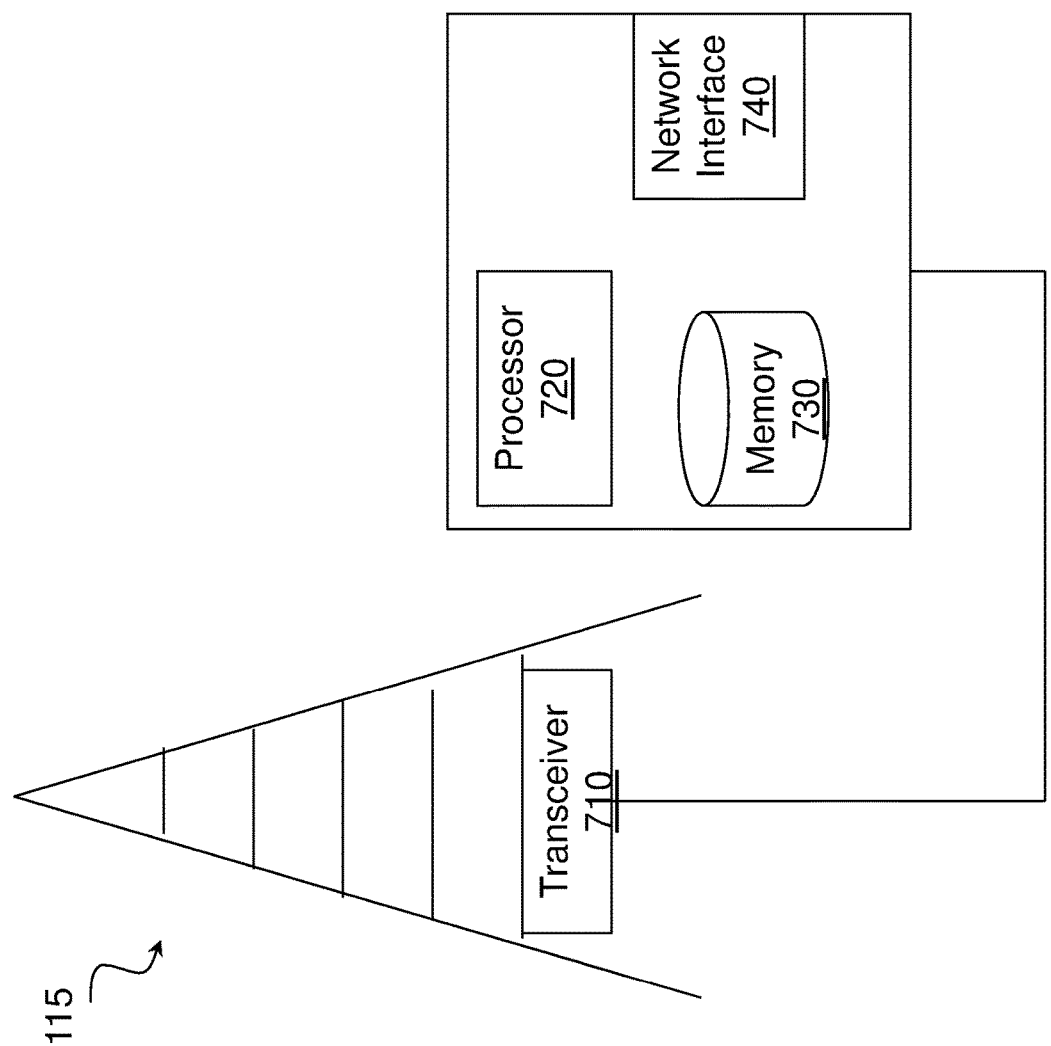
FIG. 7 is a block schematic of an exemplary network node, in accordance with certain embodiments.

FIG. 7 is a block schematic of an exemplary network node, in accordance with certain embodiments. Network node 115 may be any type of radio network node or any network node that communicates with a UE and/or with another network node. Examples of network node 115 include an eNodeB, a node B, a base station, a wireless access point (e.g., a Wi-Fi access point), a low power node, a base transceiver station (BTS), relay, donor node controlling relay, transmission points, transmission nodes, remote RF unit (RRU), remote radio head (RRH), multi-standard radio (MSR) radio node such as MSR BS, nodes in distributed antenna system (DAS), O&M, OSS, SON, positioning node (e.g., E-SMLC), MDT, or any other suitable network node. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 710, processor 720, memory 730, and network interface 740. In some embodiments, transceiver 710 facilitates transmitting wireless signals to and receiving wireless signals from wireless device 110 (e.g., via antenna 750), processor 720 executes instructions to provide some or all of the functionality described above as being provided by a network node 115, memory 730 stores the instructions executed by processor 720, and network interface 740 communicates signals to backend network components, such as a gateway, switch, router, Internet, Public Switched Telephone Network (PSTN), core network nodes or radio network controllers 130, etc.

Processor 720 may include any suitable combination of hardware and software implemented in one or more modules to execute instructions and manipulate data to perform some or all of the described functions of network node 115, such as those described above in relation to FIGS. 1-5 above. In some embodiments, processor 720 may include, for example, one or more computers, one or more central processing units (CPUs), one or more microprocessors, one or more applications, and/or other logic.

Memory 730 is generally operable to store instructions, such as a computer program, software, an application including one or more of logic, rules, algorithms, code, tables, etc. and/or other instructions capable of being executed by a processor. Examples of memory 730 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 740 is communicatively coupled to processor 720 and may refer to any suitable device operable to receive input for network node 115, send output from network node 115, perform suitable processing of the input or output or both, communicate to other devices, or any combination of the preceding. Network interface 740 may include appropriate hardware (e.g., port, modem, network interface card, etc.) and software, including protocol conversion and data processing capabilities, to communicate through a network.

Other embodiments of network node 115 may include additional components beyond those shown in FIG. 7 that may be responsible for providing certain aspects of the radio network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Figure 8:
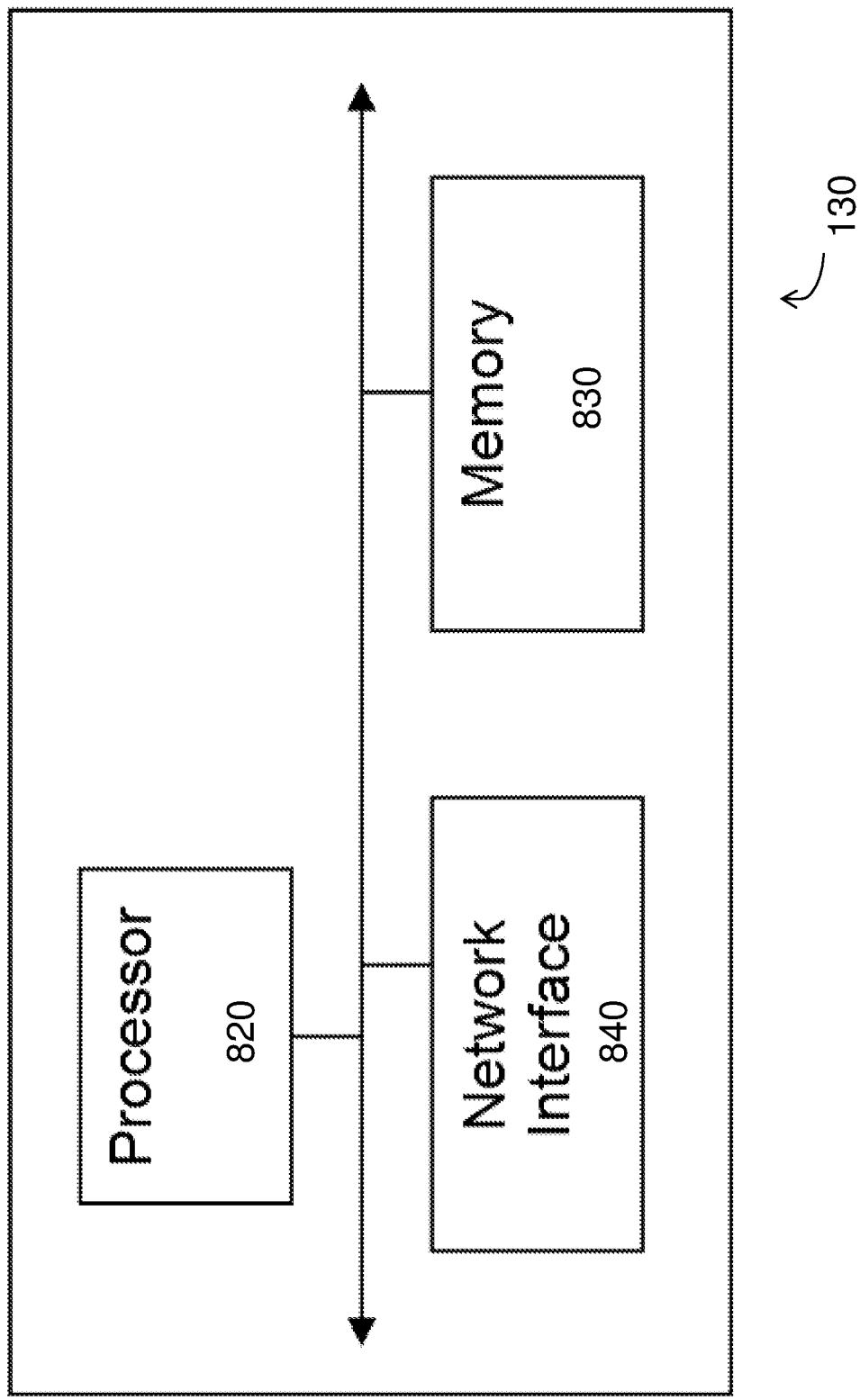
FIG. 8 is a block schematic of an exemplary radio network controller or core network node, in accordance with certain embodiments.

FIG. 8 is a block schematic of an exemplary radio network controller or core network node 130, in accordance with certain embodiments. Examples of network nodes can include a mobile switching center (MSC), a serving GPRS support node (SGSN), a mobility management entity (MME), a radio network controller (RNC), a base station controller (BSC), and so on. The radio network controller or core network node 130 includes processor 820, memory 830, and network interface 840. In some embodiments, processor 820 executes instructions to provide some or all of the functionality described above as being provided by the network node, memory 830 stores the instructions executed by processor 820, and network interface 840 communicates signals to any suitable node, such as a gateway, switch, router, Internet, Public Switched Telephone Network (PSTN), network nodes 115, radio network controllers or core network nodes 130, etc.

Processor 820 may include any suitable combination of hardware and software implemented in one or more modules to execute instructions and manipulate data to perform some or all of the described functions of the radio network controller or core network node 130. In some embodiments, processor 820 may include, for example, one or more computers, one or more central processing units (CPUs), one or more microprocessors, one or more applications, and/or other logic.

Memory 830 is generally operable to store instructions, such as a computer program, software, an application including one or more of logic, rules, algorithms, code, tables, etc. and/or other instructions capable of being executed by a processor. Examples of memory 830 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, network interface 840 is communicatively coupled to processor 820 and may refer to any suitable device operable to receive input for the network node, send output from the network node, perform suitable processing of the input or output or both, communicate to other devices, or any combination of the preceding. Network interface 840 may include appropriate hardware (e.g., port, modem, network interface card, etc.) and software, including protocol conversion and data processing capabilities, to communicate through a network.

Other embodiments of the network node may include additional components beyond those shown in FIG. 8 that may be responsible for providing certain aspects of the network node's functionality, including any of the functionality described above and/or any additional functionality (including any functionality necessary to support the solution described above).

Figure 9:
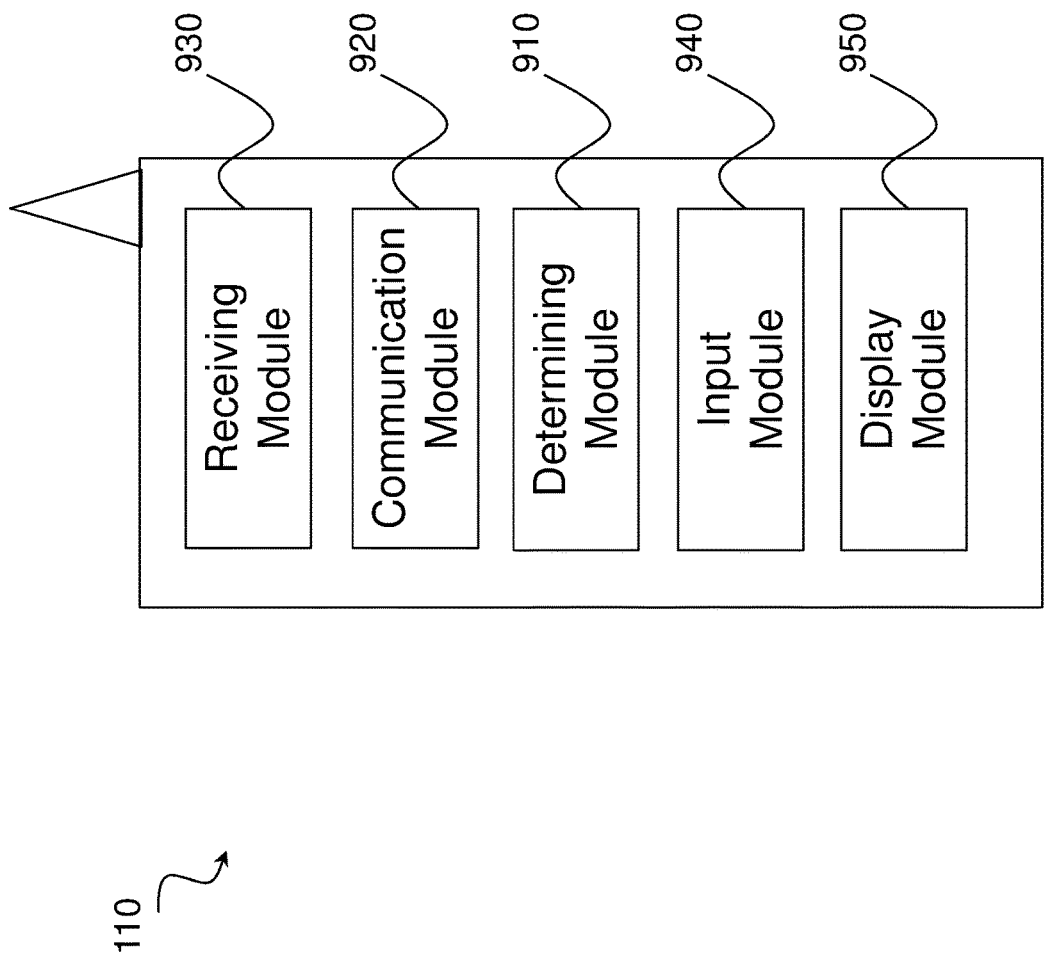
FIG. 9 is a block schematic of an exemplary wireless device, in accordance with certain embodiments.

FIG. 9 is a block schematic of an exemplary wireless device, in accordance with certain embodiments. Wireless device 110 may include one or more modules. For example, wireless device 110 may include a determining module 910, a communication module 920, a receiving module 930, an input module 940, a display module 950, and any other suitable modules. In some embodiments, one or more of determining module 910, communication module 920, receiving module 930, input module 940, display module 950, or any other suitable module may be implemented using one or more processors, such as processor 620 described above in relation to FIG. 6. In certain embodiments, the functions of two or more of the various modules may be combined into a single module. Wireless device 110 may perform the methods for dropping measurements of synchronization signals described above with respect to FIGS. 1-5.

Determining module 910 may perform the processing functions of wireless device 110. For example, determining module 910 may determine a synchronization source for wireless device 110. As another example, determining module 910 may determine a synchronization priority of the synchronization source. As another example, determining module 910 may determine one or more rules for dropping transmissions of sidelink synchronization signals, the one or more rules corresponding to the synchronization priority of the synchronization source. As yet another example, determining module 910 may drop transmissions of sidelink synchronization signals according to the determined one or more rules for dropping transmissions of sidelink synchronization signals. As still another example, determining module 910 may determine whether wireless device 110 is accurately synchronized to the determined synchronization source. Determining module 910 may include or be included in one or more processors, such as processor 620 described above in relation to FIG. 6. Determining module 910 may include analog and/or digital circuitry configured to perform any of the functions of determining module 910 and/or processor 620 described above. The functions of determining module 910 described above may, in certain embodiments, be performed in one or more distinct modules.

Communication module 920 may perform the transmission functions of wireless device 110. Communication module 920 may transmit messages to one or more of network nodes 115 of network 100. Communication module 920 may include a transmitter and/or a transceiver, such as transceiver 610 described above in relation to FIG. 6. Communication module 920 may include circuitry configured to wirelessly transmit messages and/or signals. In particular embodiments, communication module 920 may receive messages and/or signals for transmission from determining module 910. In certain embodiments, the functions of communication module 920 described above may be performed in one or more distinct modules.

Receiving module 930 may perform the receiving functions of wireless device 110. For example, receiving module 930 may receive information about the one or more rules for dropping transmissions of sidelink synchronization signals from one of a network node or another wireless device. Receiving module 930 may include a receiver and/or a transceiver, such as transceiver 610 described above in relation to FIG. 6. Receiving module 930 may include circuitry configured to wirelessly receive messages and/or signals. In particular embodiments, receiving module 930 may communicate received messages and/or signals to determining module 910. The functions of receiving module 930 described above may, in certain embodiments, be performed in one or more distinct modules.

Input module 940 may receive user input intended for wireless device 110. For example, the input module may receive key presses, button presses, touches, swipes, audio signals, video signals, and/or any other appropriate signals. The input module may include one or more keys, buttons, levers, switches, touchscreens, microphones, and/or cameras. The input module may communicate received signals to determining module 910. The functions of input module 940 described above may, in certain embodiments, be performed in one or more distinct modules.

Display module 950 may present signals on a display of wireless device 110. Display module 950 may include the display and/or any appropriate circuitry and hardware configured to present signals on the display. Display module 950 may receive signals to present on the display from determining module 910. The functions of display module 950 described above may, in certain embodiments, be performed in one or more distinct modules.

Determining module 910, communication module 920, receiving module 930, input module 940, and display module 950 may include any suitable configuration of hardware and/or software. Wireless device 110 may include additional modules beyond those shown in FIG. 9 that may be responsible for providing any suitable functionality, including any of the functionality described above and/or any additional functionality (including any functionality necessary to support the various solutions described herein).

Figure 10:
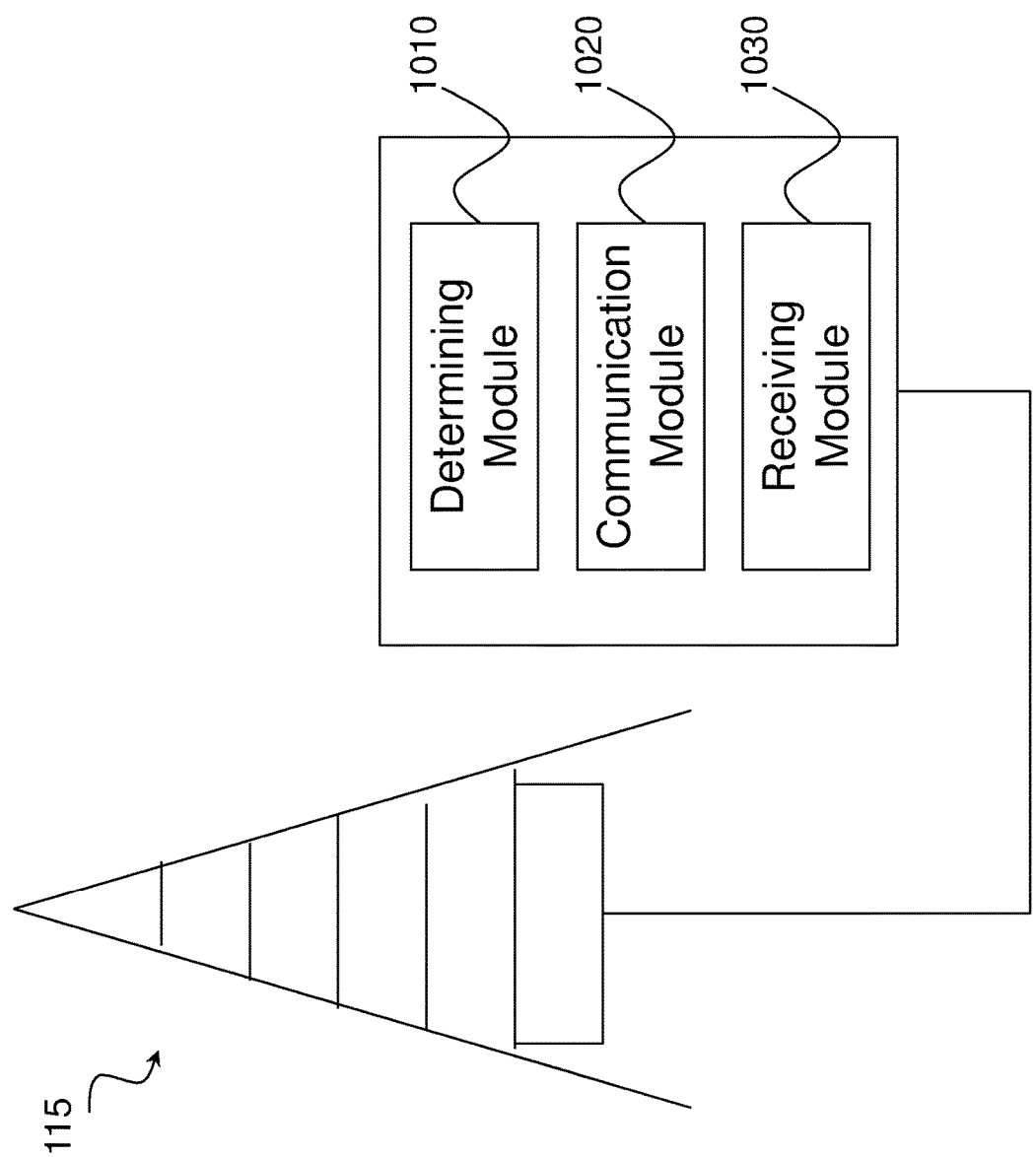
FIG. 10 is a block schematic of an exemplary network node, in accordance with certain embodiments.

FIG. 10 is a block schematic of an exemplary network node 115, in accordance with certain embodiments. Network node 115 may include one or more modules. For example, network node 115 may include determining module 1010, communication module 1020, receiving module 1030, and any other suitable modules. In some embodiments, one or more of determining module 1010, communication module 1020, receiving module 1030, or any other suitable module may be implemented using one or more processors, such as processor 720 described above in relation to FIG. 7. In certain embodiments, the functions of two or more of the various modules may be combined into a single module. Network node 115 may perform the methods for dropping measurements of synchronization signals described above with respect to FIGS. 1-5.

Determining module 1010 may perform the processing functions of network node 115. For example, determining module 1010 may define one or more rules for dropping transmissions of sidelink synchronization signals by a wireless device, the one or more rules corresponding to a synchronization priority of a synchronization source. As another example, determining module 1010 may determine a synchronization priority for one or more synchronization sources. Determining module 1010 may include or be included in one or more processors, such as processor 720 described above in relation to FIG. 7. Determining module 1010 may include analog and/or digital circuitry configured to perform any of the functions of determining module 1010 and/or processor 720 described above. The functions of determining module 1010 may, in certain embodiments, be performed in one or more distinct modules.

Communication module 1020 may perform the transmission functions of network node 115. For example, communication module 1020 may communicate information about the defined one or more rules for dropping transmissions of sidelink synchronization signals to the wireless device. Communication module 1020 may transmit messages to one or more of wireless devices 110. Communication module 1020 may include a transmitter and/or a transceiver, such as transceiver 710 described above in relation to FIG. 7. Communication module 1020 may include circuitry configured to wirelessly transmit messages and/or signals. In particular embodiments, communication module 1020 may receive messages and/or signals for transmission from determining module 1010 or any other module. The functions of communication module 1020 may, in certain embodiments, be performed in one or more distinct modules.

Receiving module 1030 may perform the receiving functions of network node 115. Receiving module 1030 may receive any suitable information from a wireless device. Receiving module 1030 may include a receiver and/or a transceiver, such as transceiver 710 described above in relation to FIG. 7. Receiving module 1030 may include circuitry configured to wirelessly receive messages and/or signals. In particular embodiments, receiving module 1030 may communicate received messages and/or signals to determining module 1010 or any other suitable module. The functions of receiving module 1030 may, in certain embodiments, be performed in one or more distinct modules.

Determining module 1010, communication module 1020, and receiving module 1030 may include any suitable configuration of hardware and/or software. Network node 115 may include additional modules beyond those shown in FIG. 10 that may be responsible for providing any suitable functionality, including any of the functionality described above and/or any additional functionality (including any functionality necessary to support the various solutions described herein).

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

Abbreviations used in the preceding description include:
3G Third Generation of Mobile Telecommunications Technology
3 GPP 3rd Generation Partnership Project
AP Access Point
BS Base Station
BSC Base Station Controller
BSM Basic Safety Message
BTS Base Transceiver Station
BW Bandwidth
CAM Cooperative Awareness Message
CDM Code Division Multiplexing
CPE Customer Premises Equipment
D2D Device-to-Device Communication
DAS Distributed Antenna System
DENM Decentralized Environmental Notification Message
DL Downlink
DPTF Data Packet Transmission Format
DSRC Dedicated Short-Range Communications
eNB evolved Node B
EPDCCH Enhanced Physical Downlink Control Channel
ETSI European Telecommunications Standards Institute
FDD Frequency Division Duplex
GNSS Global Navigation Satellite System
LAN Local Area Network
LEE Laptop Embedded Equipment
LME Laptop Mounted Equipment
LTE Long Term Evolution
M2M Machine-to-Machine
MAN Metropolitan Area Network
MCE Multi-cell/multicast Coordination Entity
MSR Multi-standard Radio
NAS Non-Access Stratum
PDCCH Physical Downlink Control Channel
PDSCH Physical Downlink Shared Channel
ProSe Proximity Services
PSTN Public Switched Telephone Network
PSBCH Physical Sidelink Broadcast Channel
PUSCH Physical Uplink Shared Channel
PUCCH Physical Uplink Control Channel
RB Resource Block
RNC Radio Network Controller
RRC Radio Resource Control
RRH Remote Radio Head
RRU Remote Radio Unit
RS Reference Signal
SAE Society of the Automotive Engineers
SLSS Sidelink Synchronization Signal
TDD Time Division Duplex
UE User Equipment
UL Uplink
V2I Vehicle-to-Infrastructure
V2P Vehicle-to-Pedestrian
V2V Vehicle-to-Vehicle
V2x Vehicle-to-anything-you-can-imagine
WAN Wide Area Network

The invention claimed is:

1. A method in a wireless device, comprising:
determining a synchronization source for the wireless device;
determining a synchronization priority of the synchronization source;
determining one or more rules for dropping transmissions of sidelink synchronization signals, the one or more rules corresponding to the synchronization priority of the synchronization source; and
dropping transmissions of sidelink synchronization signals according to the determined one or more rules for dropping transmissions of sidelink synchronization signals, wherein the one or more rules for dropping sidelink synchronization signal transmissions comprise a rule allowing the wireless device to drop an amount of sidelink synchronization signal transmissions during a period of time equal to or greater than a periodicity with which one or more external synchronization sources generate sidelink synchronization signals.

2. The method of claim 1, wherein determining the one or more rules for dropping transmissions of sidelink synchronization signals comprises autonomously determining the one or more rules for dropping transmissions of sidelink synchronization signals.

3. The method of claim 1, wherein determining the one or more rules for dropping transmissions of sidelink synchronization signals comprises receiving information about the one or more rules for dropping transmissions of sidelink synchronization signals from one of a network node or another wireless device.

4. The method of claim 1, comprising determining whether the wireless device is accurately synchronized to the determined synchronization source.

5. The method of claim 1, wherein the synchronization priority of the synchronization source is based on an accuracy level of the synchronization source.

6. The method of claim 1, wherein:
a first synchronization source has a first synchronization priority, the one or more rules corresponding to the first synchronization priority comprising a rule prohibiting the wireless device from dropping transmissions of sidelink synchronization signals for the purpose of detecting incoming synchronization signals.

7. The method of claim 6, wherein:
a second synchronization source has a second synchronization priority that is lower than the first synchronization priority, the one or more rules corresponding to the second synchronization priority comprising a rule allowing the wireless device to drop a first amount of sidelink synchronization signal transmissions for the purpose of detecting incoming synchronization signals, wherein the first amount comprises one of a first fraction of sidelink synchronization signal transmissions and a first number of sidelink synchronization signal transmissions within a period of time.

8. The method of claim 7, wherein:
a third synchronization source has a third synchronization priority that is lower than the first and second synchronization priorities, the one or more rules corresponding to the third synchronization priority comprising a rule allowing the wireless device to drop a second amount of sidelink synchronization signal transmissions for the purpose of detecting incoming synchronization signals, wherein the second amount is greater than the first amount.

9. The method of claim 1, wherein the synchronization source comprises one of:
a Global Navigation Satellite System (GNSS) signal;
a network node signal; and
a sidelink synchronization signal.

10. The method of claim 9, wherein:
the synchronization source is the GNSS signal, the GNSS signal having a higher synchronization priority than the network node signal and the sidelink synchronization signal;
the one or more rules corresponding to the synchronization priority of the GNSS signal comprise a rule prohibiting the wireless device from dropping transmissions of sidelink synchronization signals for the purpose of detecting incoming synchronization signals; and
dropping transmissions of sidelink synchronization signals according to the determined one or more rules for dropping transmissions of sidelink synchronization signals comprises not dropping transmissions of sidelink synchronization signals for the purpose of detecting incoming synchronization signals.

11. The method of claim 1, wherein a periodicity with which one or more external synchronization sources generate sidelink synchronization signals is known by the wireless device, and the period of time is less than the periodicity with which one or more external synchronization sources generate synchronization signals.

12. A method in a network node, comprising:
defining one or more rules for dropping transmissions of sidelink synchronization signals by a wireless device, the one or more rules corresponding to a synchronization priority of a synchronization source; and
communicating information about the defined one or more rules for dropping transmissions of sidelink synchronization signals to the wireless device, wherein the one or more rules for dropping sidelink synchronization signal transmissions comprise a rule allowing the wireless device to drop an amount of sidelink synchronization signal transmissions during a period of time equal to or greater than a periodicity with which one or more external synchronization sources generate sidelink synchronization signals.

13. The method of claim 12, comprising determining a synchronization priority for one or more synchronization sources based on an accuracy level of the synchronization source.

14. The method of claim 12, wherein:
a first synchronization source has a first synchronization priority, the defined one or more rules corresponding to the first synchronization priority comprising a rule prohibiting the wireless device from dropping transmissions of sidelink synchronization signals for the purpose of detecting incoming synchronization signals; and
a second synchronization source has a second synchronization priority that is lower than the first synchronization priority, the defined one or more rules corresponding to the second synchronization priority comprising a rule allowing the wireless device to drop a first amount of sidelink synchronization signal transmissions for the purpose of detecting incoming synchronization signals, wherein the first amount comprises one of a first fraction of sidelink synchronization signal transmissions and a first number of sidelink synchronization signal transmissions within a period of time.

15. The method of claim 14, wherein:
a third synchronization source has a third synchronization priority that is lower than the first and second synchronization priorities, the defined one or more rules corresponding to the third synchronization priority comprising a rule allowing the wireless device to drop a second amount of sidelink synchronization signal transmissions for the purpose of detecting incoming synchronization signals, wherein the second amount is greater than the first amount.

16. The method of claim 12, wherein the synchronization source comprises one of:
a Global Navigation Satellite System (GNSS) signal;
a network node signal; and
a sidelink synchronization signal.

17. The method of claim 16, wherein:
the synchronization source is the GNSS signal, the GNSS signal having a higher synchronization priority than the network node signal and the sidelink synchronization signal;
the defined one or more rules corresponding to the synchronization priority of the GNSS signal comprise a rule prohibiting the wireless device from dropping transmissions of sidelink synchronization signals for the purpose of detecting incoming synchronization signals.

18. The method of claim 12, wherein a periodicity with which one or more external synchronization sources generate sidelink synchronization signals is known by the wireless device, and the period of time is less than the periodicity with which one or more external synchronization sources generate synchronization signals.

19. A wireless device, comprising:
one or more processors, the one or more processors configured to:
determine a synchronization source for the wireless device;
determine a synchronization priority of the synchronization source;
determine one or more rules for dropping transmissions of sidelink synchronization signals, the one or more rules corresponding to the synchronization priority of the synchronization source; and
drop transmissions of sidelink synchronization signals according to the determined one or more rules for dropping transmissions of sidelink synchronization signals, wherein the one or more rules for dropping sidelink synchronization signal transmissions comprise a rule allowing the wireless device to drop an amount of sidelink synchronization signal transmissions during a period of time equal to or greater than a periodicity with which one or more external synchronization sources generate sidelink synchronization signals.

20. A network node, comprising:
one or more processors, the one or more processors configured to:
define one or more rules for dropping transmissions of sidelink synchronization signals by a wireless device, the one or more rules corresponding to a synchronization priority of a synchronization source; and
communicate information about the defined one or more rules for dropping transmissions of sidelink synchronization signals to the wireless device, wherein the one or more rules for dropping sidelink synchronization signal transmissions comprise a rule allowing the wireless device to drop an amount of sidelink synchronization signal transmissions during a period of time equal to or greater than a periodicity with which one or more external synchronization sources generate sidelink synchronization signals.

* * * * *